US006173881B1

(12) United States Patent
Sloan et al.

(10) Patent No.: US 6,173,881 B1
(45) Date of Patent: Jan. 16, 2001

(54) CAR BODY ASSEMBLY AND WELDING STATION WITH RECIPROCAL GATE-SUPPORTING SYSTEM

(75) Inventors: Kenneth R. Sloan, Troy; Leonard A. Zanger, Bloomfield Hills; Edward L. Jarvis, Howell; Johnny D. Lucaora, Clinton Township, all of MI (US)

(73) Assignee: Progressive Tool & Industries Company, Southfield, MI (US)

( * ) Notice: Under 35 U.S.C. 154(b), the term of this patent shall be extended for 0 days.

(21) Appl. No.: 09/189,894

(22) Filed: Nov. 11, 1998

Related U.S. Application Data

(60) Provisional application No. 60/065,114, filed on Nov. 12, 1997, and provisional application No. 60/076,901, filed on Mar. 5, 1998.

(51) Int. Cl.$^7$ .............................. B23K 5/22; B23K 37/00
(52) U.S. Cl. .......................... 228/4.1; 228/212; 219/80; 219/158
(58) Field of Search ...................... 228/4.1, 212; 29/559, 29/791; 219/647, 658, 80, 79, 121.63, 158

(56) References Cited

U.S. PATENT DOCUMENTS

| | | |
|---|---|---|
| 3,968,558 | 7/1976 | Sekine et al. . |
| 4,162,387 | 7/1979 | De Candia . |
| 4,256,947 | 3/1981 | De Candia . |
| 4,442,335 | 4/1984 | Rossi . |
| 4,494,687 | 1/1985 | Rossi . |
| 4,682,722 | 7/1987 | Bossotto et al. . |
| 4,776,085 | 10/1988 | Shiba ..................................... 29/824 |
| 4,795,075 * | 1/1989 | Pigott et al. ............................ 228/45 |
| 4,811,891 * | 3/1989 | Yamaoka et al. ..................... 228/182 |
| 4,905,884 | 3/1990 | Alborante et al. . |
| 4,991,707 | 2/1991 | Alexander et al. . |
| 5,011,068 | 4/1991 | Stoutenburg et al. . |
| 5,037,022 * | 8/1991 | Rossi ..................................... 228/47 |
| 5,115,115 | 5/1992 | Alborante . |
| 5,141,093 | 8/1992 | Alexander . |
| 5,143,270 * | 9/1992 | Hamada et al. ....................... 228/4.1 |
| 5,151,570 * | 9/1992 | Sakurai ............................... 219/86.25 |
| 5,174,488 | 12/1992 | Alborante . |
| 5,184,766 | 2/1993 | Takahashi et al. .................... 228/4.1 |
| 5,186,304 | 2/1993 | Kaczmarek et al. . |
| 5,258,598 * | 11/1993 | Alborante . |
| 5,343,996 * | 9/1994 | Nuschak . |
| 5,397,047 * | 3/1995 | Zampini . |
| 5,400,943 * | 3/1995 | Rossi . |
| 5,409,158 * | 4/1995 | Angel . |
| 5,427,300 * | 6/1995 | Quagline . |
| 5,560,535 * | 10/1996 | Miller et al. ........................ 228/49.1 |
| 6,008,471 * | 12/1999 | Alborante ............................. 219/158 |

* cited by examiner

*Primary Examiner*—Patrick Ryan
*Assistant Examiner*—Jonathan Johnson
(74) *Attorney, Agent, or Firm*—Young & Basile, P.C.

(57) ABSTRACT

A vehicle body welding system includes a work station for welding components of a preassembled body with respect to one another. The body is moveable along a fixed path of travel through the work station. At least two moveable pillars are located on each side of the fixed path of travel through the work station for synchronized reciprocation between first and second end limits of travel toward and away from the fixed path of travel of the body. At least one gate is connectible in a repeatable located position with respect to the moveable pillars on each side of the fixed path for synchronized reciprocation between first and second positions toward and away from the fixed path of travel of the body. Locating members are engageable between each pillar and the corresponding gate for locating the gate with respect to the moveable pillar in at least two dimensions. The locating members include at least two vertically spaced locators on each pillar for defining a vertical position and a horizontal position along an axis normal to the fixed path, and a moveable locator for locating the gate in a predetermined position along an axis parallel with respect to the fixed path of travel of the body, when the moveable locator is in a first position, and for allowing movement of the gate with respect to the pillars, when the moveable locator is in a second position.

42 Claims, 31 Drawing Sheets

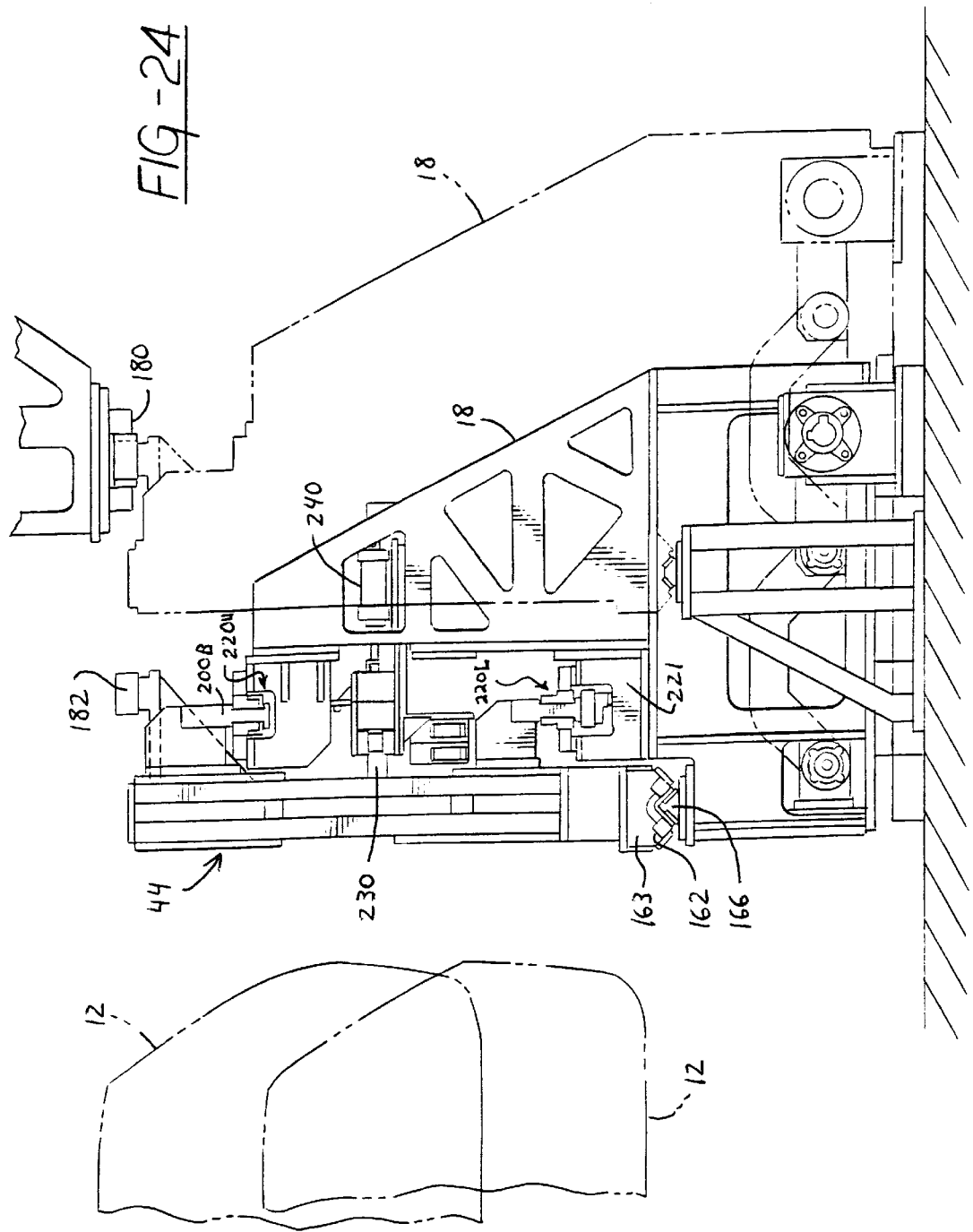

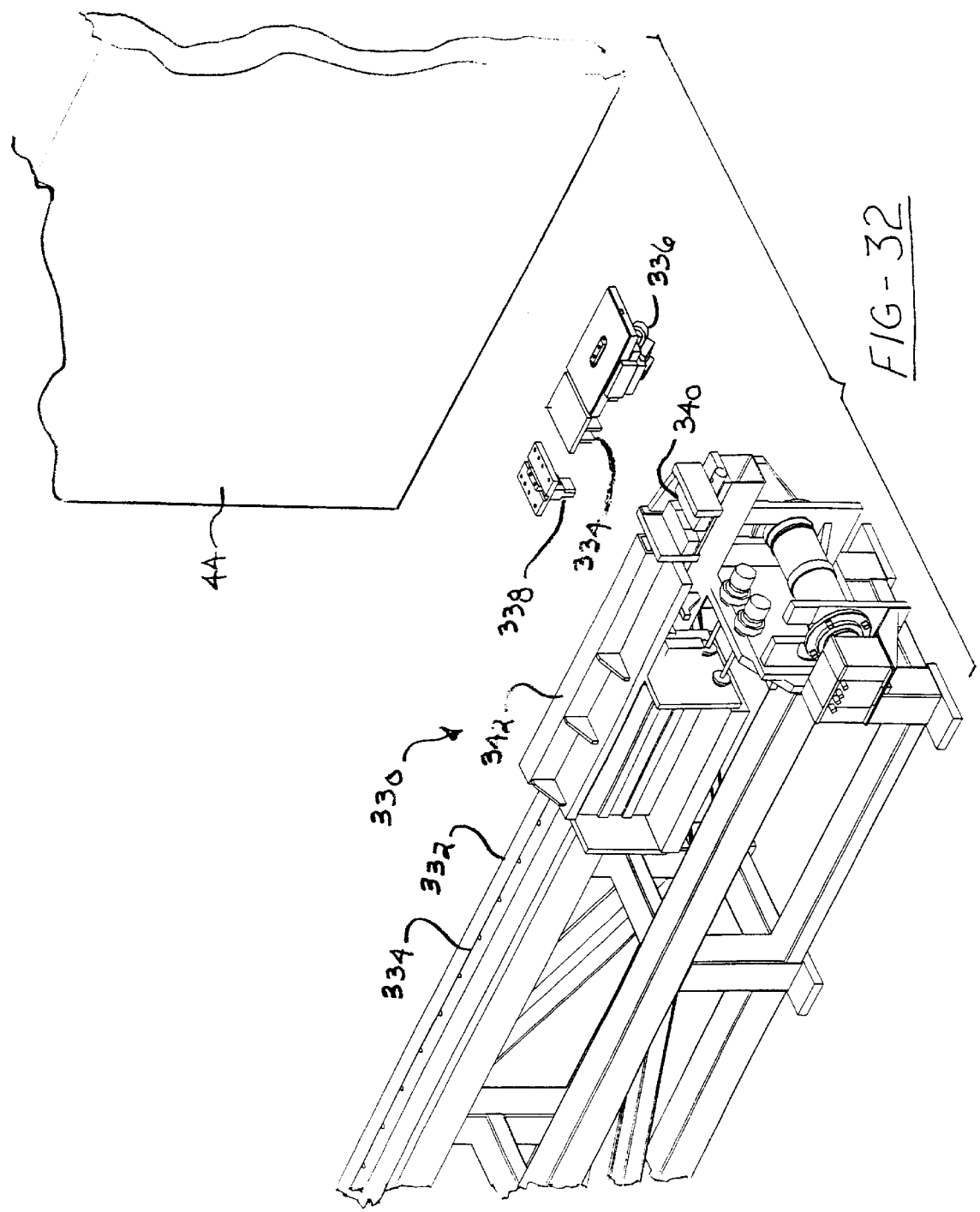

CAR BODY ASSEMBLY AND WELDING STATION WITH RECIPROCAL GATE-SUPPORTING SYSTEM

RELATED APPLICATIONS

This application is a continuation of provisional application Ser. No. 60/065,114 filed on Nov. 12, 1997, and provisional application Ser. No. 60/076,901 filed on Mar. 5, 1998.

FIELD OF THE INVENTION

The present invention relates to a production line framing apparatus for clamping and thereafter welding a loosely-assembled vehicle body, and more particularly, a framing apparatus that accurately positions and locates predetermined areas of a loosely-assembled vehicle body for accurately clamping and welding the vehicle body together with a high degree of repeatability between consecutive vehicle bodies on the production line. The framing apparatus can also be adapted to handle a plurality of different predetermined vehicle body configurations.

BACKGROUND OF THE INVENTION

The construction of a "unitized vehicle body" commences with the formation of individual major body panels by stamping the panels from a sheet metal blank. Typically, these major panels include a floor panel, right and left body side panels, a fire wall, and either a roof panel or transversely-extending header members on which a roof panel is subsequently mounted. After the individual panels are stamped, some preliminary assembly operations may then be performed on the individual panels, such as, for example, adding door hinge and latch hardware to body side panels at appropriate locations proximate the door opening, adding seat-mounting brackets and reinforcements to the floor panel, et cetera.

Next, a set of panels that together constitute a sub-assembly of the finished vehicle body is then loosely assembled together. This initial loose assembly of panels frequently is accomplished by a "toy tab" arrangement in which one or more panels is formed with a tab which projects from an edge and which is received in a slot of an adjacent panel. This technique interlocks the panels and frame members to each other to thereby form a preliminary, loosely-assembled vehicle body wherein the panels and frame members will not separate from each other, but the panels and frame members may tilt or move relative to one another. This initial loosely-assembled sub-assembly is then brought to a welding station where the various panels and frames are welded to each other in a rigid, permanently assembled relationship.

This initial welding operation step is one of the most important steps in the assembly of the vehicle body because it establishes the final welded alignment of the various panels and headers relative to each other, which is essential to subsequent assembly operations performed on the sub-assembly. During the welding operation, it is desirable that the various panels and headers be precisely and accurately located and aligned relative to one another and be held fixedly in the desired position. The positioning of the various panels and header members during the welding operation is accomplished by clamping frames which carry a plurality of individual clamps arranged thereon to clamp various body components in the desired position.

It is desirable to perform as many welding operations as possible within the same welding station since the relative positioning of the various panels and headers is critical to the ability to precisely relocate and reclamp the vehicle body at subsequent stations along the production line. Due to variations between assembly stations and variation and movement of the various panels and headers, it is impossible to subsequently relocate and reclamp the vehicle body without inadvertently stacking up tolerances or creating variances between the relative positioning of the various panels and headers. Therefore, it is desirable to frame as much of the vehicle body as possible within the same welding station so that a maximum number of welding operations can be performed on the vehicle body without having to subsequently reclamp and relocate the vehicle body since reclamping and relocating may increase the tolerances between the relative positions of the various panels and headers of the vehicle body and decrease the repeatability between consecutive vehicle bodies in the production line.

To accomplish multiple welds, programmable robotic welders have been used to perform several welds at different locations on a vehicle body at a single welding station. The programmable robotic welders are typically located at a welding station and on opposite sides of the conveyor line passing through the welding station. When the vehicle body sub-assembly is conveyed to and positioned at the welding station, the head of one welder may, for example, be extended to pass through the vehicle door opening to apply several tack welds along the seam between the vehicle body side panel and the vehicle body floor panel. In situations where the clamping frames are positioned at opposite sides of the vehicle body, clearance problems can arise and may restrict the range of motion of the welding head that must first pass through the clamping frame before the welding head can gain access to the vehicle body. Welding head access problems can require that the portions of the vehicle body that cannot be accessed by the welding head at the first welding station must instead be accessed at a subsequent, second welding station. This is an undesirable situation, since the vehicle body must be relocated and reclamped at a subsequent, second welding station, thereby increasing the likelihood of tolerance buildup between the relative positions of the various panels and headers of the vehicle body and also decreasing the repeatability between consecutive vehicle bodies in the production line.

Another problem arises when separate clamping frames are employed at opposite sides of the vehicle body, since the two clamping frames must be independently located in a predetermined relationship relative to each other and to the position occupied by the vehicle body that the frames are to clamp in place. Since the two separate clamping frames are not directly connected to one another, the frames must use a common positional reference that is either defined by a spatial orientation or by a fixture or linkage assembly. These types of two-frame systems exhibit problems with repeatability, since two-frame referencing techniques inherently create tolerance build-ups within the systems due to repeated movements, thermal expansion and contraction, mechanical wear, et cetera. Also, when separate clamping frames are changed to accommodate different vehicle body styles or configurations, the problems with repeatability can be further magnified, which is undesirable.

In the automotive industry today, it is common for one particular car model to have several different body styles. Accommodating each body style requires clamping and welding different body locations as well as gaining access to different body areas so that the clamping and welding apparatus can be properly positioned while extending through the clamping frame. To avoid the situation of having to supply separate production lines and welding stations for the different body styles of a particular car model, it is desirable to provide a single welding station that can be adapted to accommodate a plurality of different body styles in a quick and efficient manner while ensuring the accuracy and repeatability that are required of the welding operation.

SUMMARY OF THE INVENTION

The present invention provides a framing apparatus that accurately and efficiently clamps and welds a loosely-assembled vehicle body with a high degree of repeatability between consecutive vehicle bodies in a production line, while also being able to adapt to a plurality of predetermined, different loosely-assembled vehicle body configurations and styles in a quick and efficient manner. A vehicle body welding station according to the present invention includes a work station for welding components of a loosely, pre-assembled body with respect to one another. The body is movable along a fixed path of travel through the work station in a production line. A base frame extends transversely with respect to the fixed path of travel of the vehicle underbody at the work station to allow an underbody of the vehicle to be accurately positioned with respect to the base frame at the work station. At least one pillar is located at each side of the fixed path of travel at the work station and is mounted on the base frame for reciprocal movement transversely with respect to the fixed path of travel. Each pillar is movable between a first position, which allows entry and accurate positioning of the underbody with respect to the base frame and which also allows entry of other components into the work station, and a second position for accurately locating and clamping the other components with respect to the underbody. At least one welder is located at each side of the fixed path of travel for fixedly connecting the other components to the underbody at the work station while the pillars are in the second position.

At least one rail is located on each side of the fixed path of travel for guiding movement of the pillar between the first and second positions along the rail. At least one drive is located on each side of the fixed path of travel for reciprocally moving the pillar between the first and second positions along the rail. At least one gate is located on each side of the fixed path of travel and is supportable on the pillar for movement between the first and second positions. If it is desirable to provide interchangeable gate assemblies, means can be provided on each side of the fixed path of travel for moving the gate from a seated position supported by the pillar to an unseated position disengaged from the pillar. In addition, if it is desirable to automate changing of the gate assemblies, at least one indexer can be provided on each side of the fixed path of travel for moving the gate from the unseated position to a changeover position. To accommodate accurate positioning of the removable gate assemblies with respect to the pillar, at least one locator can be disposed on each gate for accurately positioning the gate with respect to the pillar.

The present invention also includes a second embodiment which provides an alternative gate transfer apparatus and/or mechanism and an alternative gate locating apparatus and/or mechanism. The gate is operative to receive various fixtures and welding equipment operative to weld a vehicle body. The gate transfer apparatus is adapted to move a gate into and out of engagement with a pillar. The pillar may then move toward or away from the vehicle body. The gate transfer apparatus includes a lower rail and an upper rail operative to engage and support the gate, the gate being movable on the upper and lower rails, and a drive mechanism including a releasable hitch and complementary socket or link which is operative to engage the gate. The drive mechanism pushes or pulls the gate along the upper and lower rails into and out of engagement with the pillar.

The gate transfer apparatus may be driven from above the gate or at ground level. The lower rail may be configured to support the weight of the gate. In one preferred embodiment, the drive mechanism may be a conveyor belt. The gate transfer apparatus allows the gate to disengage from the transfer apparatus when the gate engages the pillar. In one preferred embodiment, the gate, once on the pillar, disengages from the gate transfer apparatus by slipping out of gaps in the upper rail, while the lower rail includes removable rail segments positioned on the pillar which may be located collinear with the lower rail during gate movement along the rails.

Furthermore, the present invention may also include a gate positioning mechanism to position the gate on the pillar. The gate positioning mechanism includes at least two gate locators positioned on the pillar and at least two engaging members positioned on the gate. The engaging members are adapted to mate with the locators on the pillar to fix the position of the gate thereon.

In one preferred embodiment, the gate includes locating segments having engaging surfaces while the pillar includes roller pockets which are configured to trap the engaging surfaces of the locating segments. The pillars may also include lower roller pockets uniquely adapted to lift the gate off of the lower rail to provide an accurate vertical position for the gate. The gate positioning mechanism may also include a fore/aft locking mechanism preferably including a locking pin positioned on the gate and an extending roller pocket positioned on the pillar.

Objects, advantages, and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 24 is an elevational view of a vehicle body with the gate transfer apparatus according to the alternative embodiment as well as the gate locating apparatus according to the alternative embodiment;

FIG. 32 is a perspective view of a preferred embodiment of gate indexing means according to the present invention.

DESCRIPTION OF THE PREFERRED EMBODIMENT

Figure 7:
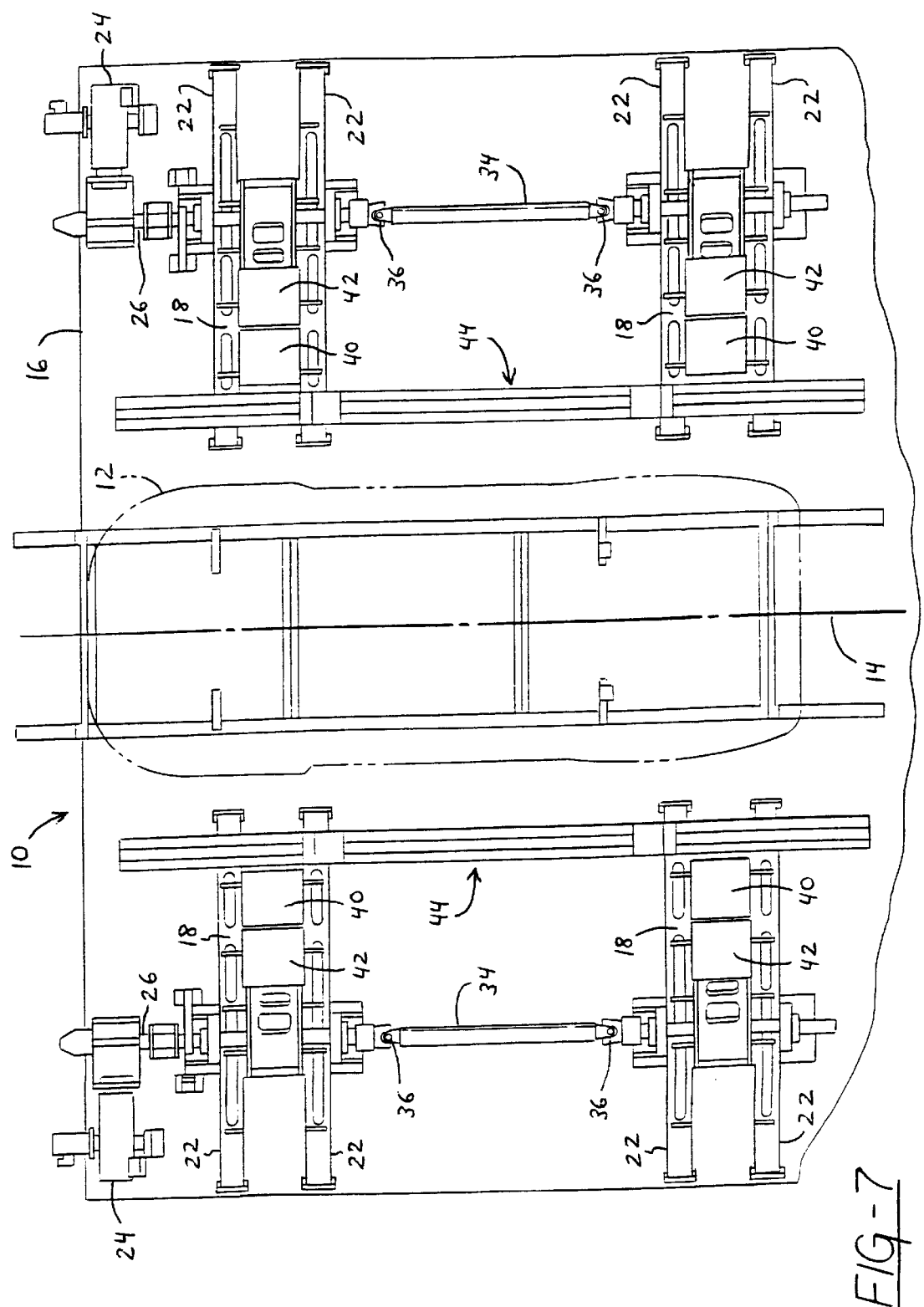
FIG. 7 is a plan view showing a work station having a pair of simultaneously operable pillars on each side of the fixed path of travel through the work station, wherein each pair of pillars is simultaneously moveable from a first position spaced transversely from the fixed path of travel to a second position disposed inwardly with respect to the fixed path of travel for accurately locating and clamping body components with respect to the underbody at the work station.

In FIG. 7, a work station 10 is illustrated in a vehicle body welding system for welding components of a pre-assembled vehicle body in precise alignment with respect to one another. The vehicle body 12 is moveable along a fixed path 14 of travel through the work station 10. A base frame 16 extends transversely with respect to the fixed path 14 of travel at the work station 10 allowing the underbody portion of the body 12 to be accurately positionable with respect to the base frame 16 at the work station 10.

Figure 8:
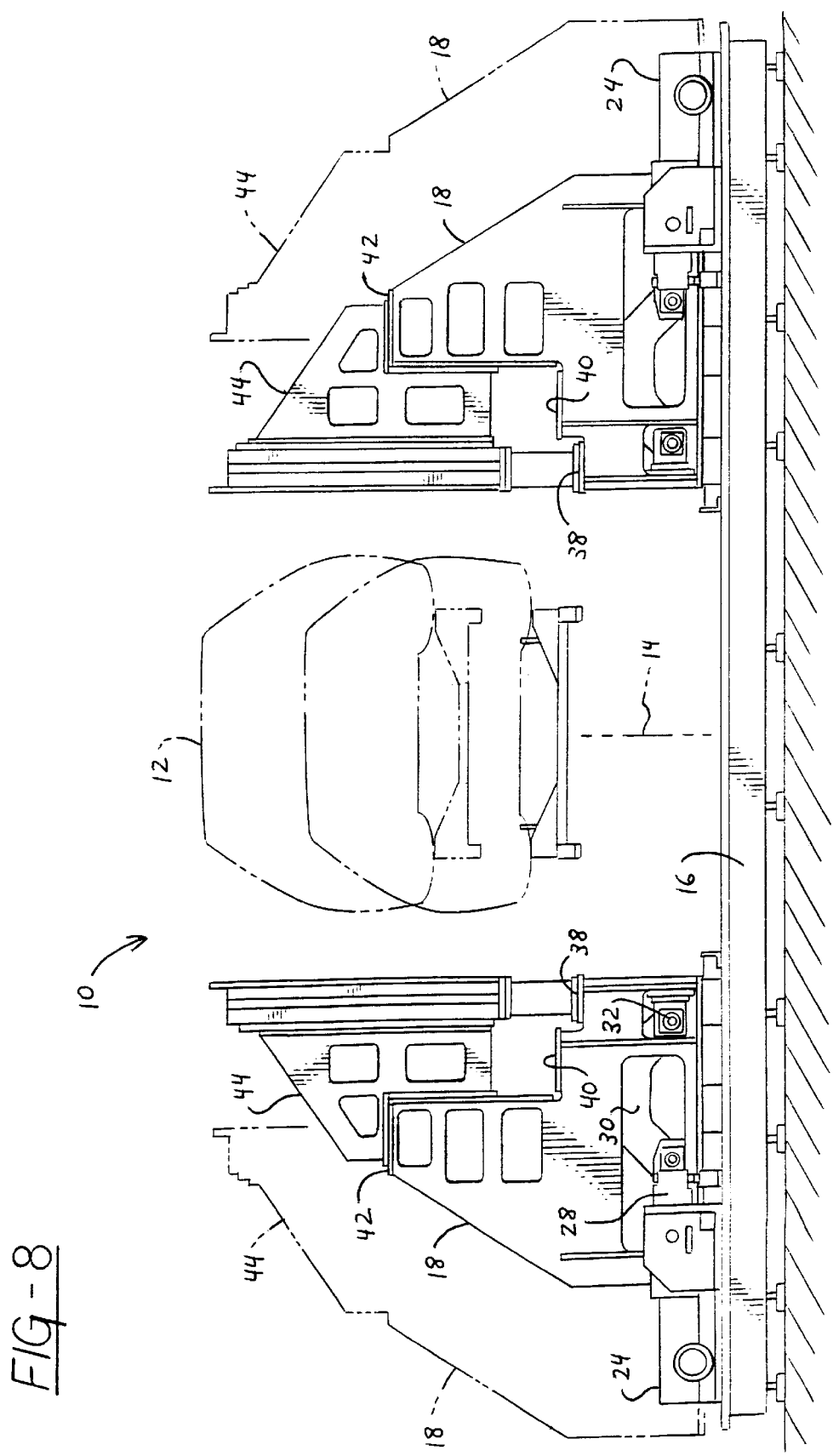
FIG. 8 is a side elevational view of the work station shown in the plan view of FIG. 7 illustrating the relative movement of the pillars between the first and second positions.
Figure 9:
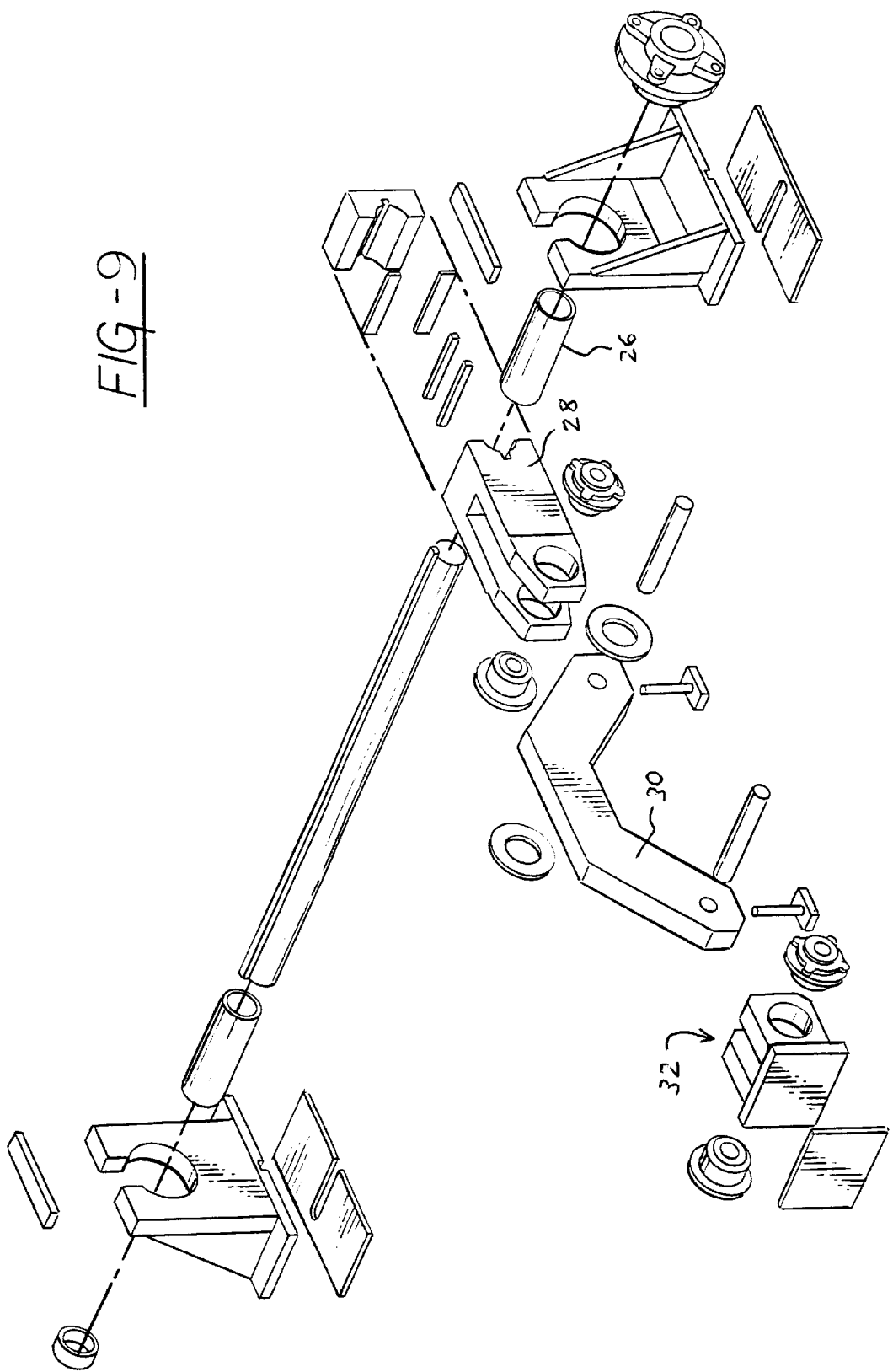
FIG. 9 is an exploded perspective view of a reciprocal crank arm and link assembly for moving each pillar between the first and second positions.
Figure 10:
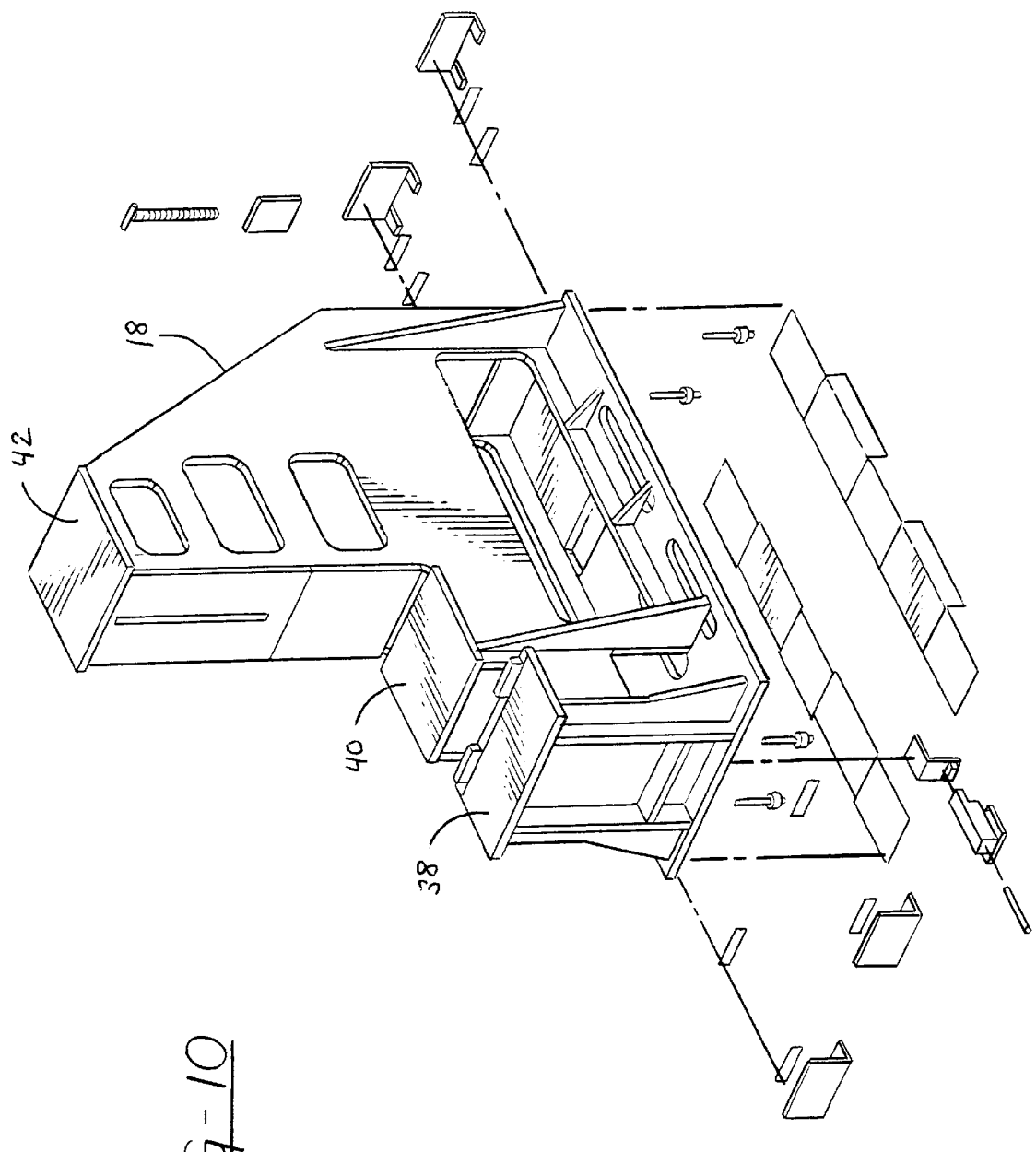
FIG. 10 is an exploded perspective view of a sliding pillar unit.

In FIGS. 1 through 10, at least one pillar 18 is located on each side of the fixed path 14 of travel at the work station 10 and is mounted on the base frame 16 for reciprocal movement transversely with respect to the fixed path 14 of travel. Each pillar 18 is moveable between a first position, shown in phantom in FIG. 8, which allows entry and accurate positioning of the underbody portion of the body 12 with respect to the base frame 16 and which allows entry of other body components of the body 12 into the work station 10, and a second position, illustrated in FIGS. 1, 2, 5, 7, and 8, for accurately locating and clamping the other body components with respect to the underbody portions of the body 12. At least one welder 20, best illustrated in phantom in FIG. 8, is located on each side of the fixed path 14 of travel for fixedly connecting the other body components to the underbody portion of the body 12 at the work station 10 while the pillar 18 is in the second position.

In FIG. 7, at least one rail 22 is located on each side of the fixed path 14 of travel for guiding each pillar 18 in movement between its first and second positions. Preferably, at least two rails 22 are provided for each pillar 18. At least one drive motor 24 is located on each side of the fixed path 14 of travel for reciprocally moving the pillar 18 between its first and second positions. Preferably, a pair of pillars 18 are located on each side of the fixed path 14 of travel and are simultaneously moveable in reciprocal motion between the first and second positions in response to actuation of the drive motor 24.

Figure 1:
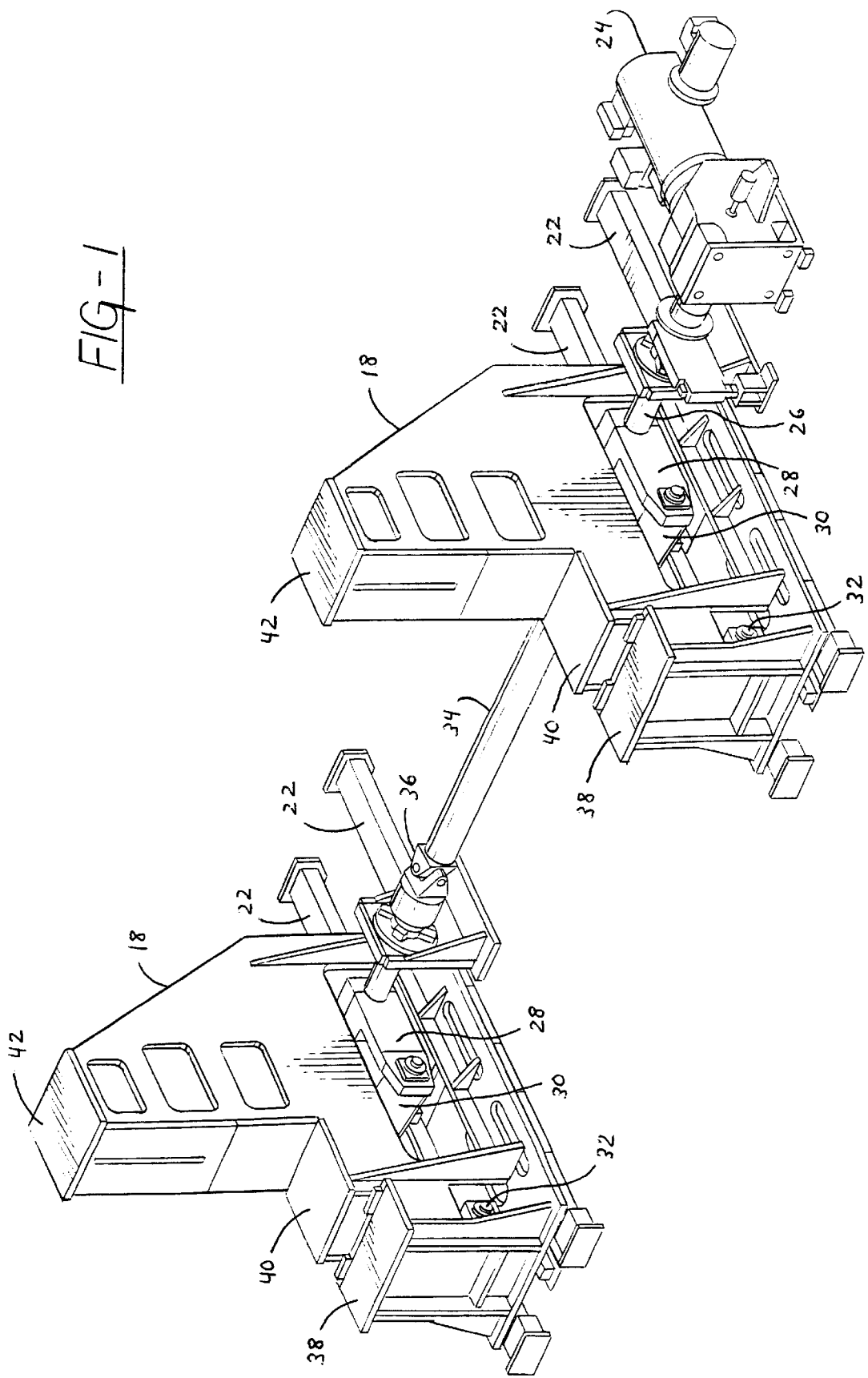
FIG. 1 is a perspective view of a pair of simultaneously reciprocal pillars taken from a side facing a fixed path of travel at a work station and with both pillars in a second position according to the present invention.
Figure 2:
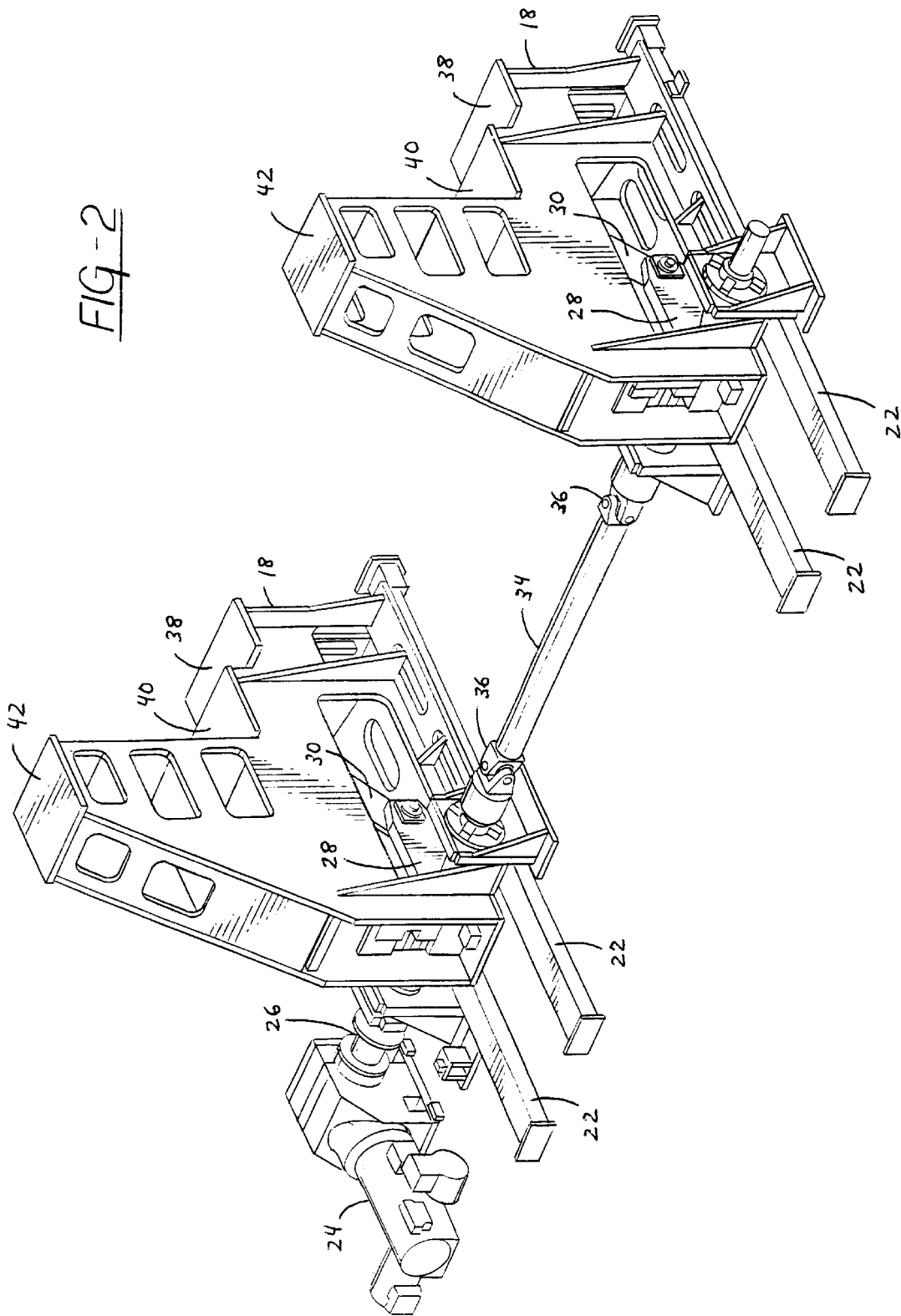
FIG. 2 is a perspective view of the pair of simultaneously reciprocal pillars illustrated in FIG. 1 from an opposite orientation illustrating the rear view of the pillars with respect to the fixed path of travel at the work station.
Figure 3:
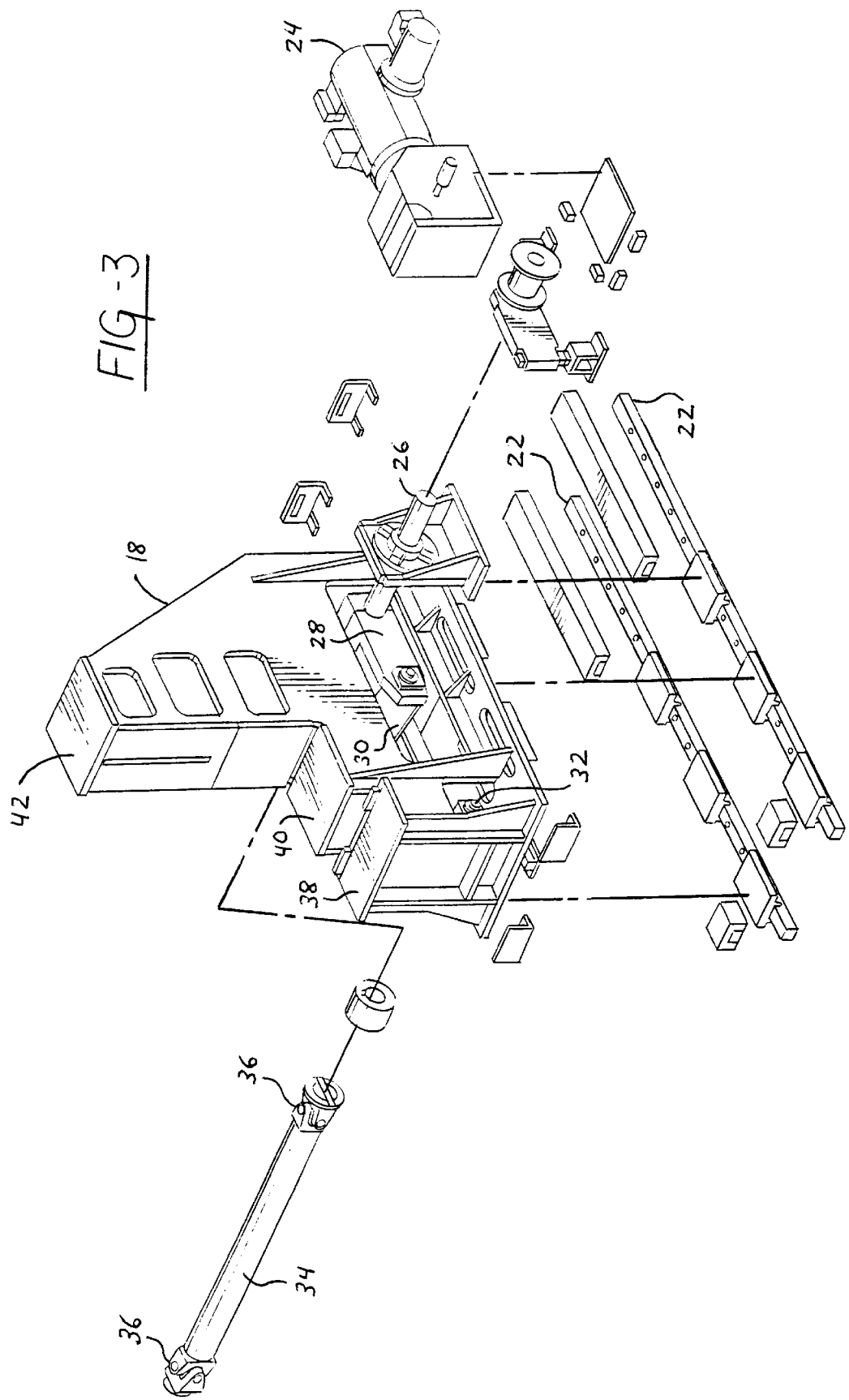
FIG. 3 is an exploded perspective view of one of the pillars and rail assembly including a drive unit according to the present invention.
Figure 4:
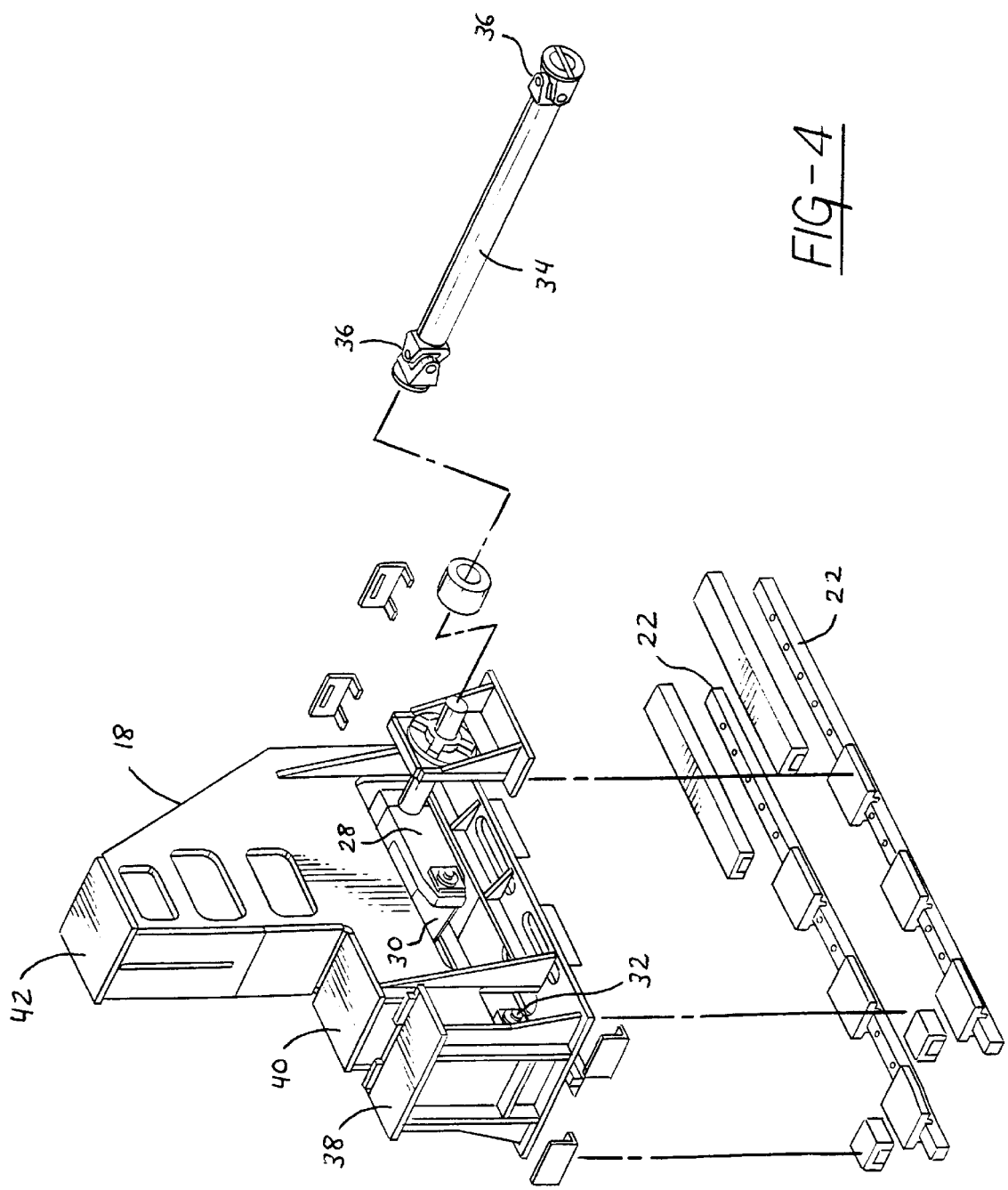
FIG. 4 is an exploded perspective view of the other pillar of the pair previously illustrated in FIGS. 1 and 2 including a rail assembly and drive shaft having universal joints for connection to the drive unit of FIG. 3.
Figure 5:
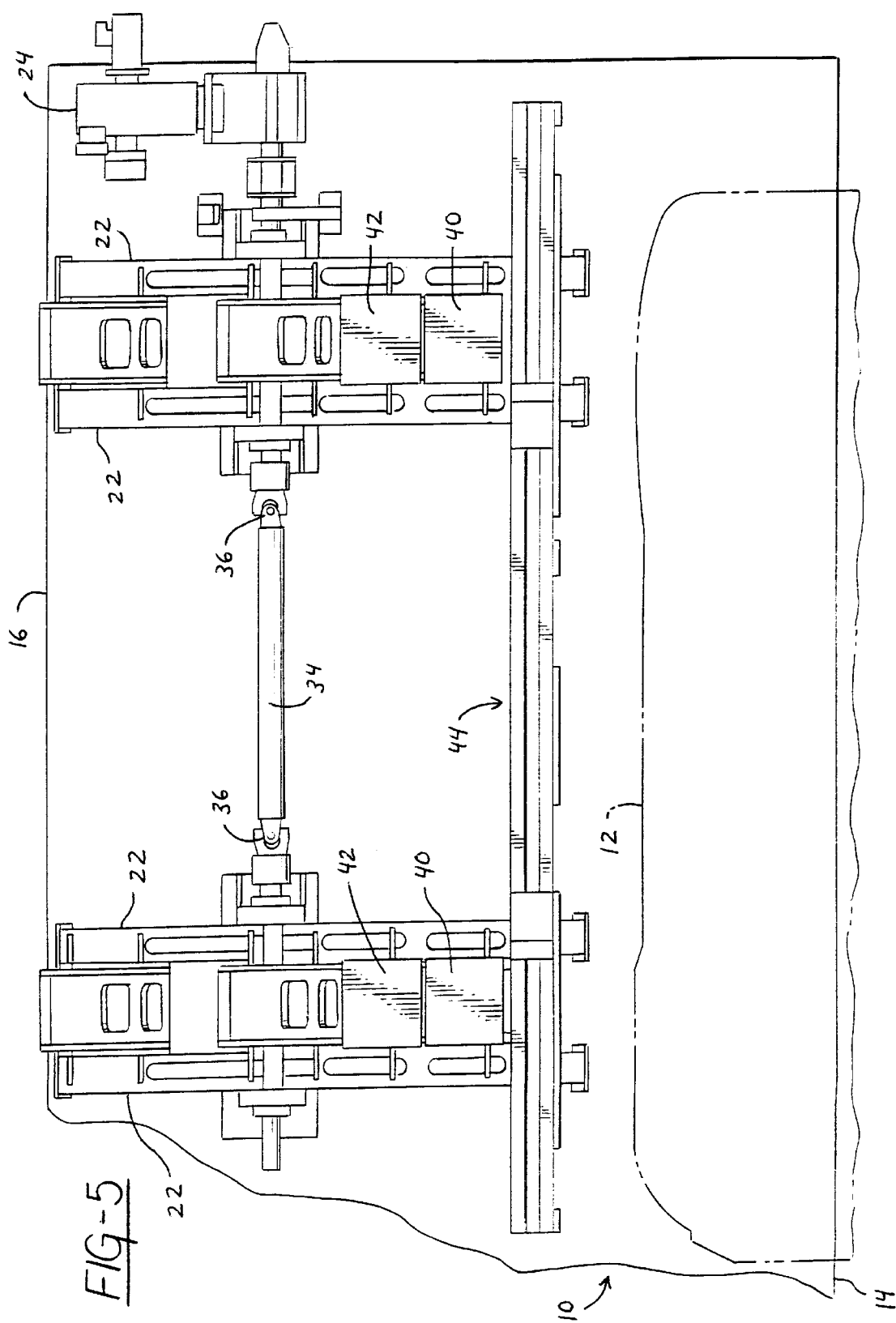
FIG. 5 is a plan view of the pair of simultaneously reciprocating pillars, illustrated in FIGS. 1 through 4 according to the present invention, at a predetermined location with respect to a body moveable along the fixed path of travel through the work station.
Figure 6:
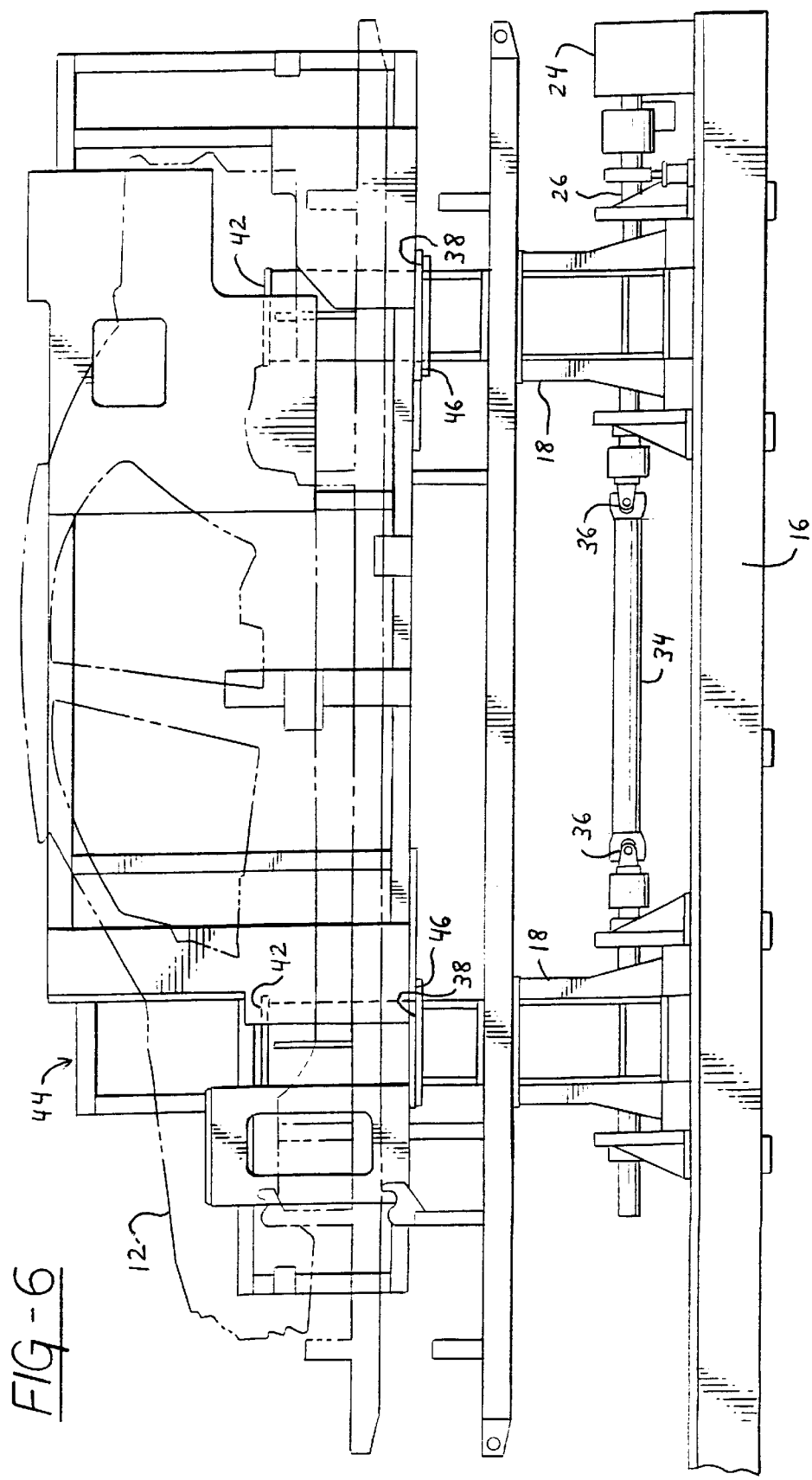
FIG. 6 is a side elevational view showing the pair of simultaneously reciprocal pillars, according to the present invention, with respect to the vehicle body moveable along the fixed path of travel through the work station, according to the present invention.

As best illustrated in FIGS. 1 through 4 and 9, the drive motor 24 rotates a shaft 26 back and forth through 180° of movement. A lever arm 28 is connected to the shaft 26 for rotation with the shaft 26. A link 30 is pivotally connected to the outer end of the lever arm 28 at one end and is pivotally connected to the pillar 18 at an opposite end of the link 30. More particularly, the opposite end of the link 30 is connected to the pillar 18 through a pivot pin connection 32. This lever arm 28 and link 30 assembly provides harmonic motion to the pillar 18, as the pillar 18 moves between its first and second positions, such that maximum acceleration is reached midway between the first and second positions and the pillar 18 decelerates as the pillar 18 approaches its first and second positions. Preferably, a lever arm 28 and link 30 are both provided for each pillar 18 to be moved simultaneously in response to actuation of the drive motor 24. It is also preferable to save space and protect the lever arm 28 and link 30 assembly from damage by housing the lever arm 28 and link 30 within a hollow portion of each pillar 18. A drive shaft extension 34 can be positioned between the pair of pillars 18 and preferably includes universal joints 36 at each end of the drive shaft extension 34. Alternatively, the drive motor 24 can be positioned between two pillars 18. The large base dimension in the transverse direction of the pillar 18 and the plurality of slide connections to the rail 22, as best illustrated in FIG. 3, provide sufficient stability to repeatably reciprocate the slidable pillars 18 between the first and second positions when supporting a fully configured gate assembly as will be described in greater detail below. Each pillar 18 includes a gate support surface 38 and first and second gate locator support surfaces 40 and 42 respectively.

Figure 13:
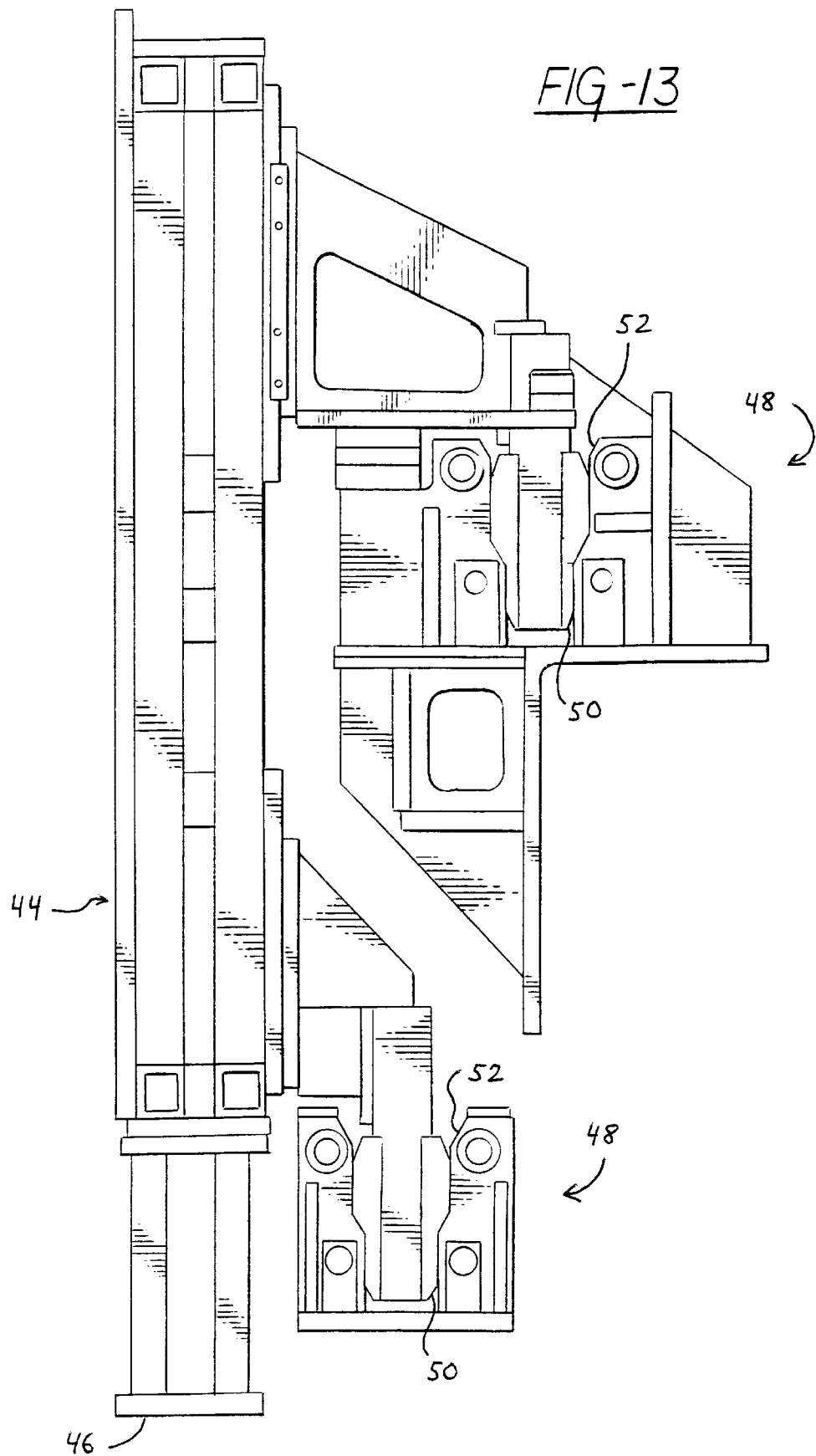
FIG. 13 is a side elevational view of a gate having a plurality of locators disposed thereon for accurately positioning the gate with respect to the pillar according to the present invention.
Figure 14:
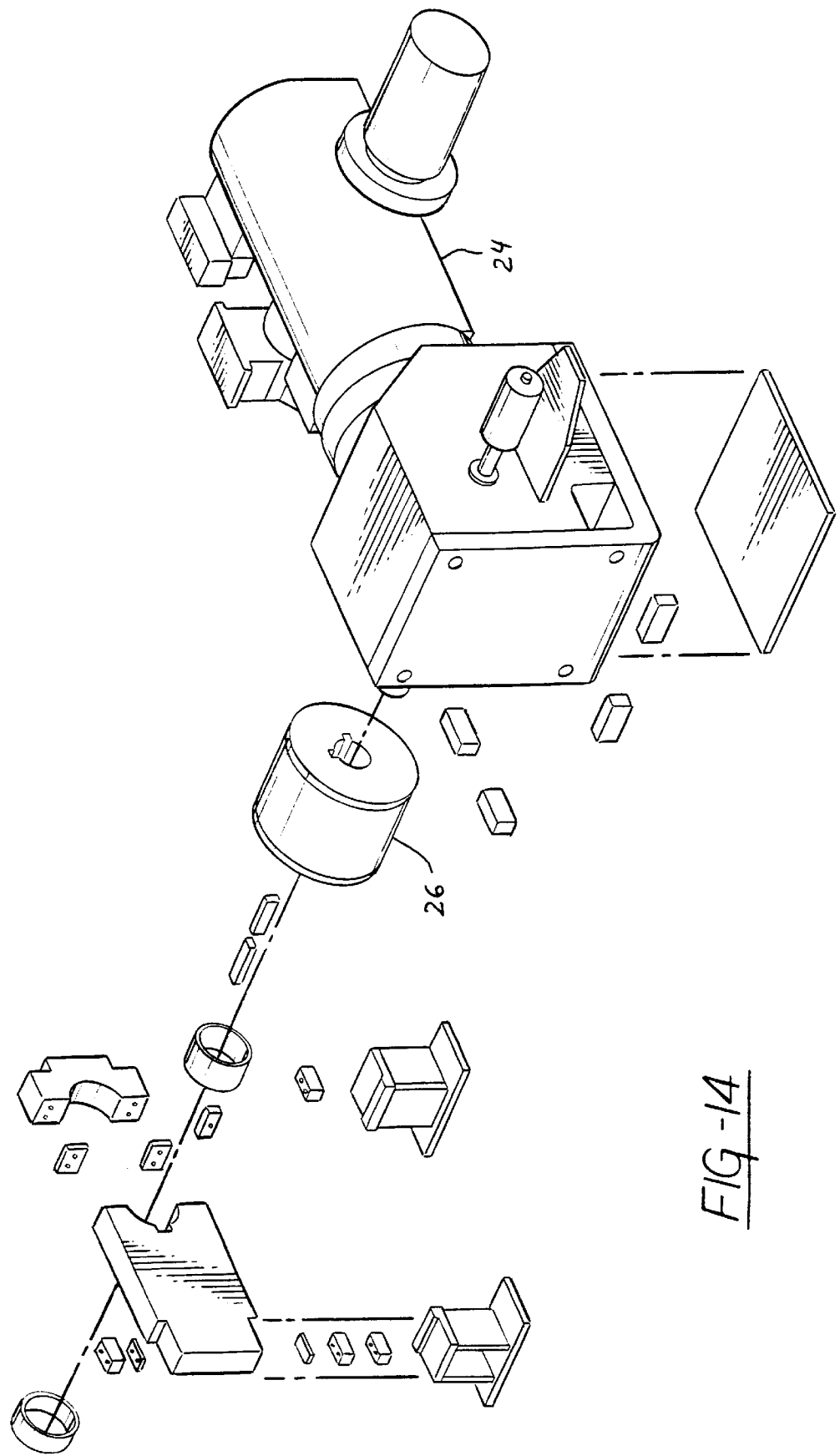
FIG. 14 is an exploded perspective view of a reciprocal drive unit for moving the pillars between the first and second positions.

As best illustrated in FIGS. 5 through 8, at least one gate 44 is located on each side of the fixed path 14 of travel and is supportable on at least one pillar 18 for movement between the first and second positions. As best illustrated in FIG. 8, each gate 44 typically includes a plurality of clamping fixtures and may also include welding machines as is known in the art. Typically, a gate 44 is specifically configured for a particular vehicle body style to be assembled at a work station as the appropriate components and underbody portions of the body 12 travel along the fixed path 14 through the work station 10. If alternate body styles are to be accommodated and handled at a single work station 10, it is desirable to adapt the gate 44 for attachment to the pillar 18 in a manner to allow interchangeable gates 44 to be substituted for different vehicle body styles as desired. In FIGS. 8 and 13, the gate 44 can include a pillar engaging surface 46 complementary in size and shape to accommodate engagement with the gate support surface 38 of the pillar 18. At one end of gate 44, as best illustrated in FIG. 13, at least one locator 48 is provided for accurately positioning the gate 44 with respect to the pillar 18. Preferably, first and second locators 48 are provided as illustrated in FIG. 13. At one end of the gate 44, the locator 48 positions the gate 44 accurately in the transverse and the longitudinal direction with respect to the fixed path 14 of travel through the work station 10. At an opposite end of the gate 44, locators 48 accurately position the gate 44 in the transverse position while permitting limited longitudinal movement to allow for variances between different gates 44 and operating conditions of the system, such as, for example, thermal expansion and contraction, or the like. Each locator 48 includes a male portion 50 and a female portion 52. As illustrated in FIG. 13, two male portions 50 are connected to the gate 44, with one located at an upper portion of each pillar 18 and another located at a lower portion of each pillar 18. The corresponding female portion 52 is connected to the pillar 18 at the first and second gate locator support surfaces 40 and 42. Such a configuration permits the gate 44 to be moved in a vertical direction to disengage the gate 44 from a seated position, supported by the pillar 18, to an unseated position, disengaged from the pillar 18, where the locators 48 have the male portions 50 disengaged from the female portion 52. When in the seated position and supported by the pillar 18, the gate 44 is accurately located in the transverse direction, longitudinal direction, and vertical direction with respect to the work station 10.

Figure 11:
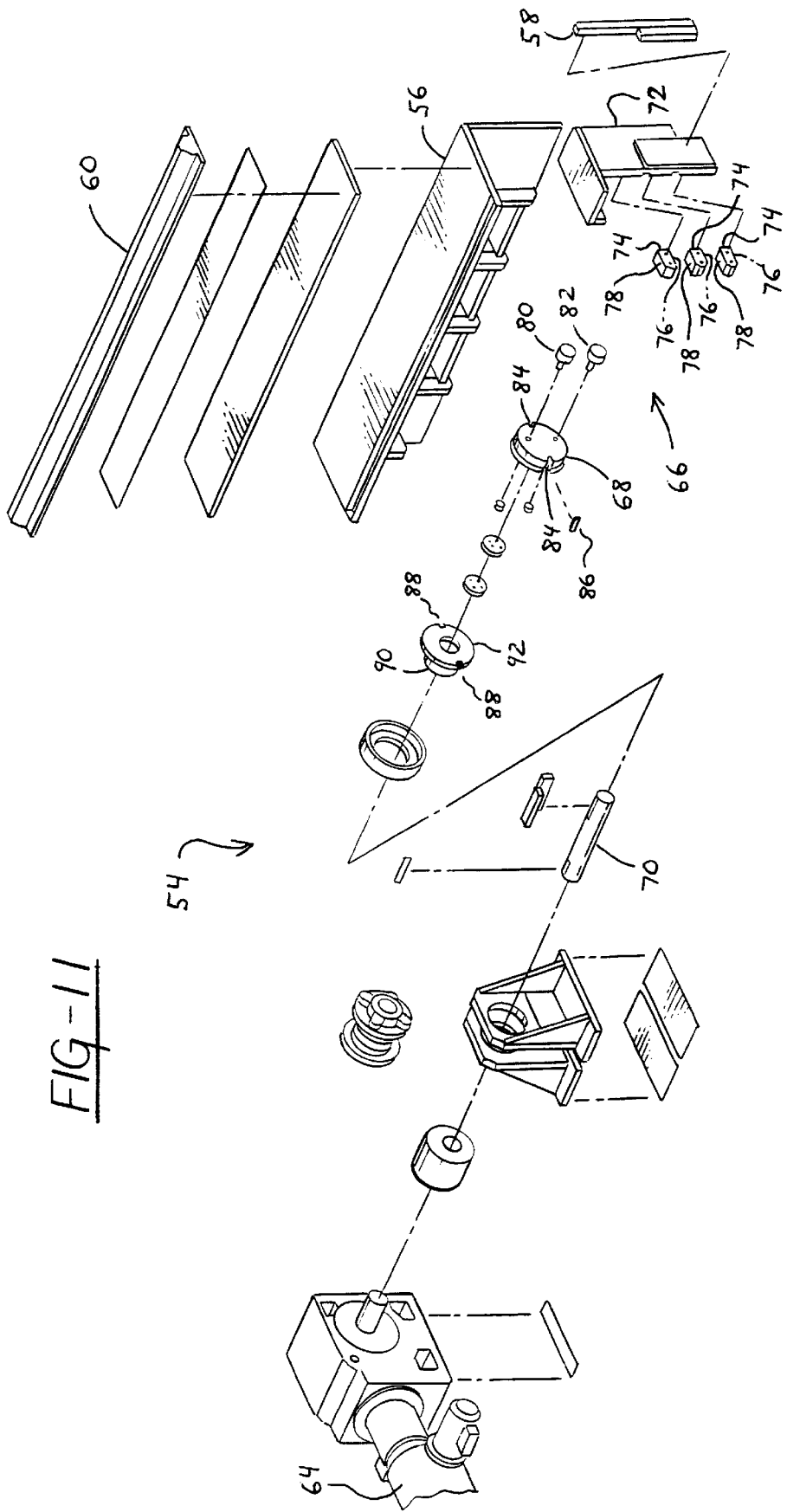
FIG. 11 is an exploded perspective view of a lift system for moving a gate from a seated position supported by the pillar to an unseated position disengaged from the pillar according to the present invention and including a geneva drive configuration for vertically moving the gate between the seated and unseated positions.

As illustrated in FIG. 11, at least one lift 54 is provided on each side of the path 14 of travel for moving the gate 44 from the seated position, supported by the pillar 18, to an unseated position, disengaged from the pillar 18. The lift 54 is engageable with the gate 44 when the pillar 18 is in the first position, spaced transversely from the fixed path 14 through the work station 10. The lift 54 includes a moveable platform 56 for reciprocal motion between an upper end limit of travel and a lower end limit of travel. The moveable platform 56 is slidably supported for vertical movement along vertically extending rails 58 at each longitudinal end of the platform 56 (only one being shown in FIG. 11 and the other being a mirror image thereof). The platform 56 preferably includes a longitudinally extending, gate-supporting rail 60 for engaging rollers 62 connected to the bottom of the gate 44, as best illustrated in FIGS. 16 through 18.

Figure 12:
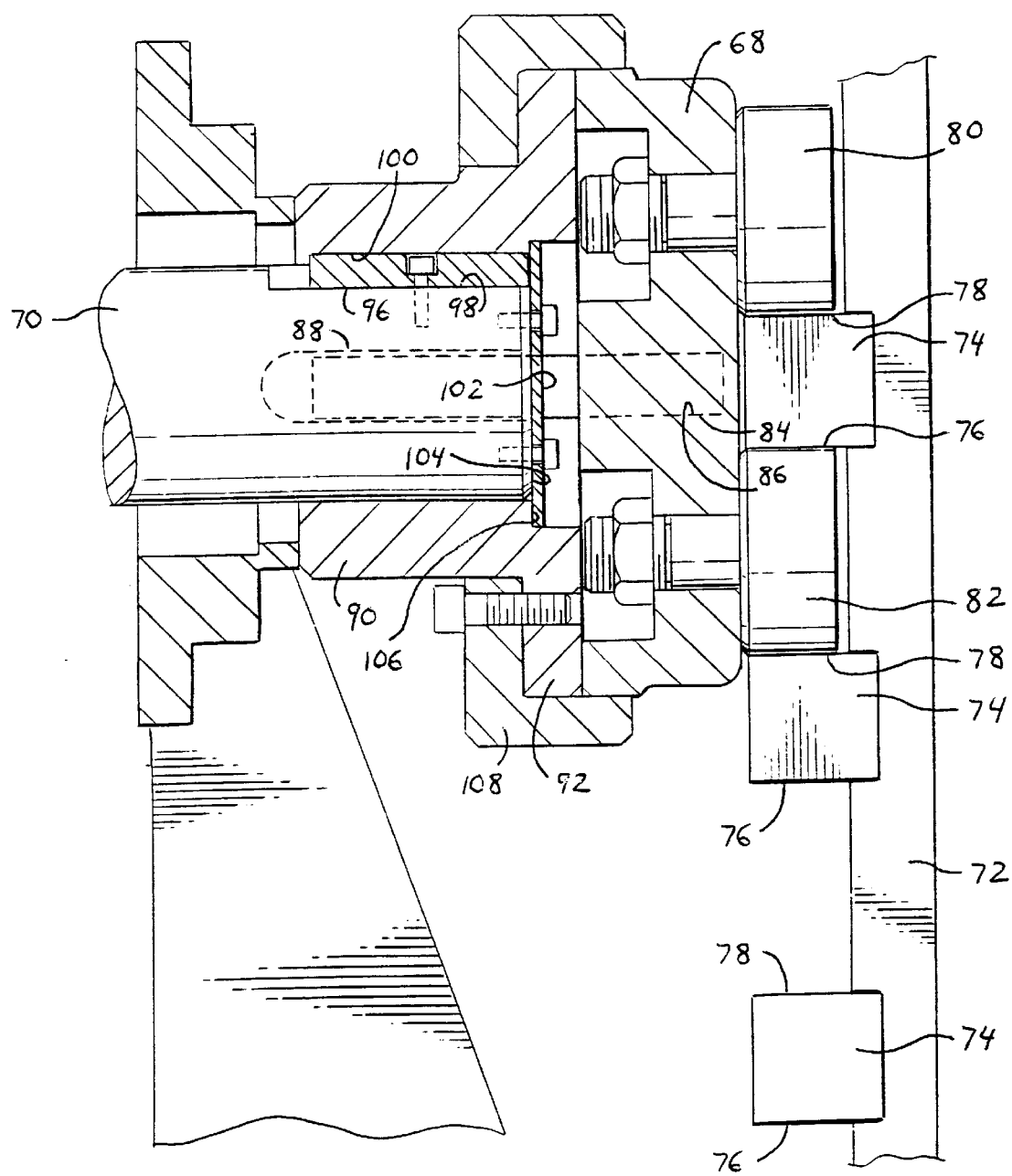
FIG. 12 is a detailed cross-sectional view of a geneva drive according to the present invention having a roller cartridge removable radially with respect to a rotational axis of a drive shaft according to the present invention.

In FIG. 11, the lift 54 includes a reversible drive motor 64 for moving the platform 56 between the upper and lower end limits of travel while carrying a gate 44. In a preferred configuration, the reversible drive motor 64 actuates a geneva drive 66 for moving the platform 56 between two end limits of travel. Details of the geneva drive 66 are best illustrated in FIGS. 11 and 12. The geneva drive 66 advantageously includes a roller cartridge 68 that can be removed radially with respect to the rotational axis of a drive shaft 70 without having to disassemble and remove the entire reversible drive motor 64.

In FIG. 12, a vertically extending portion 72 of the moveable platform 56 supports a plurality of generally rectangular blocks 74 having first and second roller-engaging cam surfaces 76 and 78 respectively formed on opposite sides of each block 74. The radially removable roller cartridge 68 supports first and second rollers 80 and 82 respectively for movement about a rotational axis of the roller cartridge 68. The roller cartridge 68 includes at least one radially and longitudinally extending slot 84 formed in a peripheral surface for receiving a longitudinally extending bar key 86. The bar key 86 also extends longitudinally into another radially and longitudinally extending slot 88 formed in a sleeve 90 having an outwardly extending flange 92. The sleeve 90 is engaged over the end of the drive shaft 70 driven by the reversible drive motor 64. A key 96 is engaged within a keyway slot 98 formed in the shaft 70 and extends radially outward into a second keyway slot 100 formed on the inner surface of the sleeve 90. The key 96 connects the sleeve 90 to the drive shaft 70 for common rotation about a rotational axis. An anchor cap 102 is fixedly connected to an outer end 104 of the drive shaft 70 and engages with a shoulder 106 formed on an inner surface of the sleeve 90 to maintain the sleeve 90 and flange 92 in a predetermined longitudinal position with respect to the rotational axis of the drive shaft 70. A longitudinally moveable collar 108 slidably engages along the external surface of the sleeve 90 and is moveable to a position to sheath the flange 92 and at least a portion of the roller cartridge 68. A plurality of bolts threadingly engage the flange 92 to fix the collar 108 with respect to the flange 92, for supporting the outer periphery of the roller cartridge 68 and the outer circumference of the flange 92 with the inner surface of the collar 108. The one or more bar keys 86 connect the roller cartridge 68 to the sleeve 90 and flange 92 in order to transmit the rotary motion from the drive shaft 70 to the roller cartridge 68. Rotation of the roller cartridge 68 moves the first and second rollers 80 and 82 respectively along the first and second cam surfaces 76 and 78 of the blocks 74 to drive the platform 56 in motion between the end limits of travel. Such a configuration allows the collar 108 to be unbolted from the flange 92 and allows the bar key 86 to be unbolted from the roller cartridge 68 and the sleeve 90 in order to permit the roller cartridge 68 to be moved radially with respect to the drive shaft 70. By removing the roller cartridge 68 radially without disturbing the surrounding equipment, maintenance of the roller cartridge 68 is simplified, and any down time for repair of the roller cartridge 68 for the lift 54 is thereby reduced.

Figure 15:
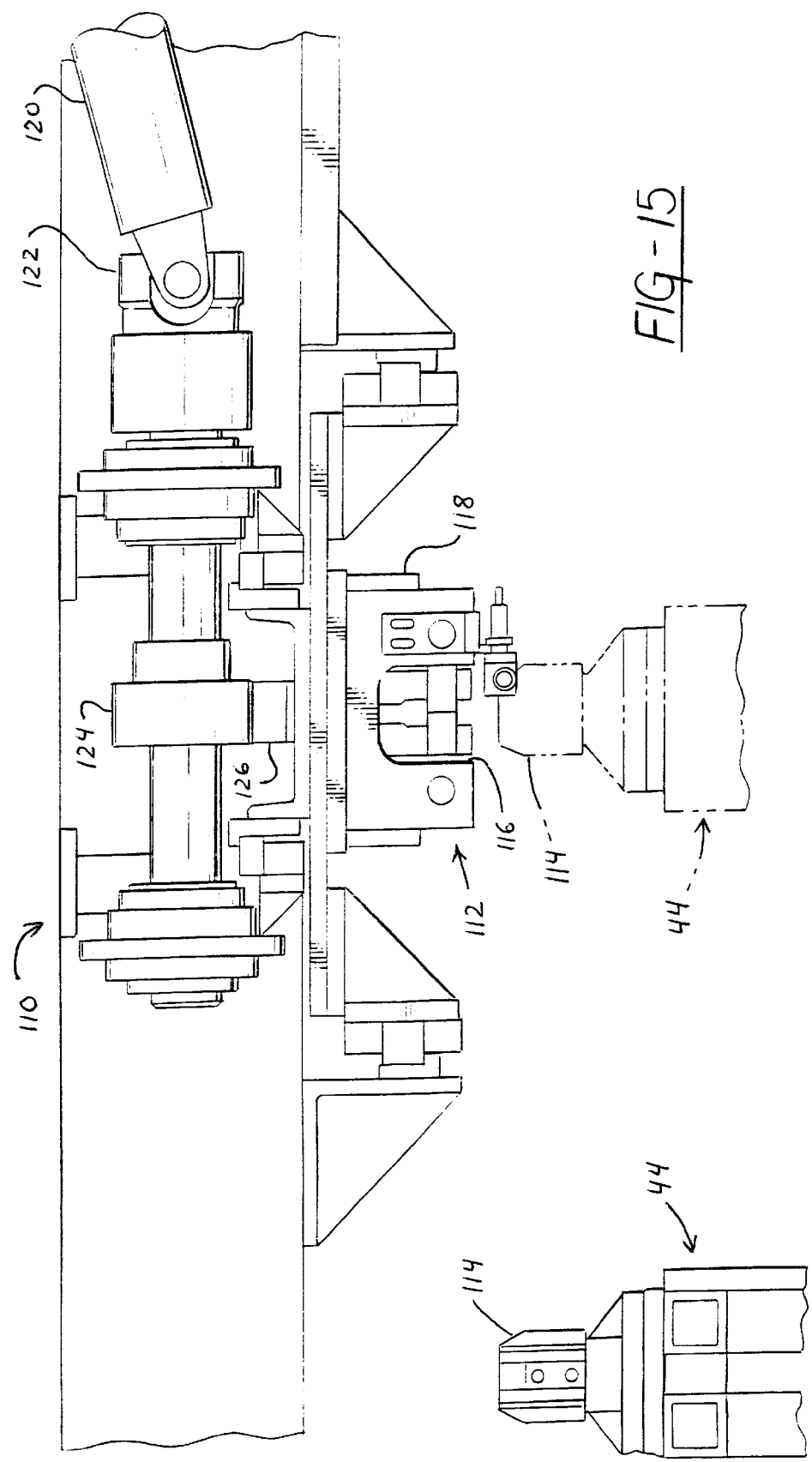
FIG. 15 is a detailed elevational view of a balcony-mounted transfer system for exchanging gates mounted on the pillars by moving the gates from the unseated position to a changeover position.
Figure 16:
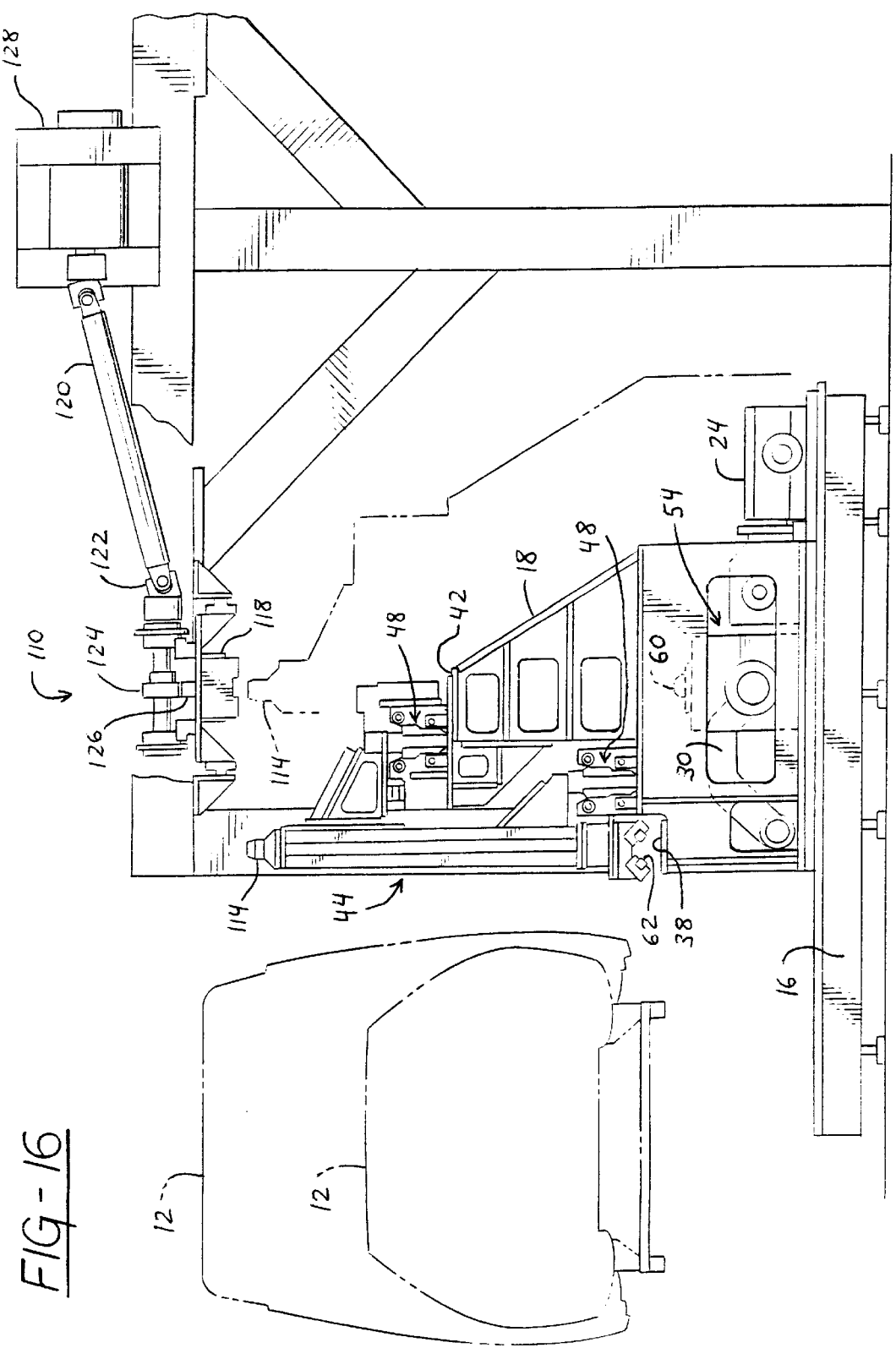
FIG. 16 is an elevational view showing the balcony-mounted transfer system with respect to the moveable pillar and the fixed path of travel through the work station.
Figure 17:
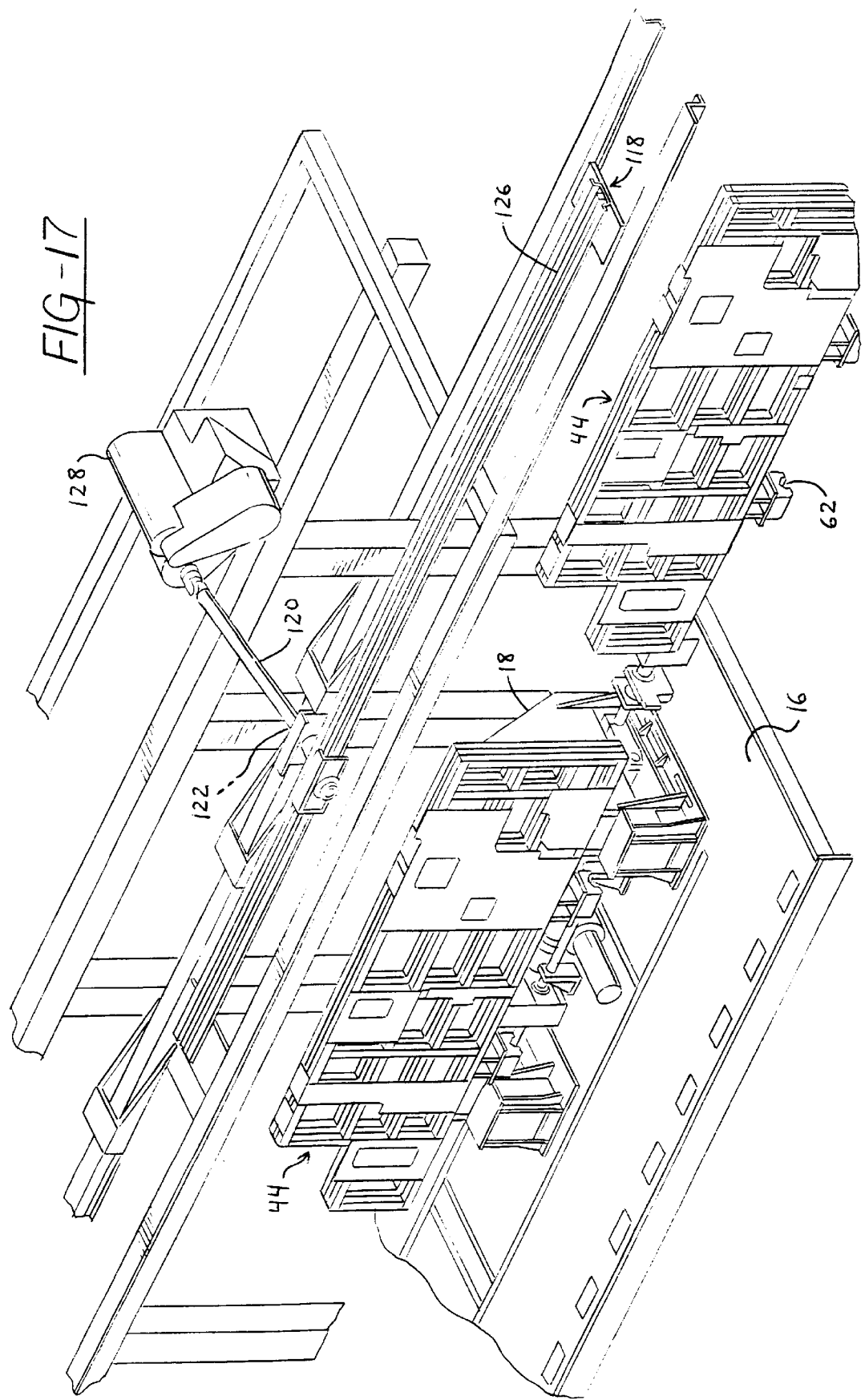
FIG. 17 is a perspective view of the work station illustrating the pair of moveable pillars on one side of the fixed path of travel and the balcony mounted transfer system for moving a gate assembly into and out of contact with the supporting pillars.
Figure 18:
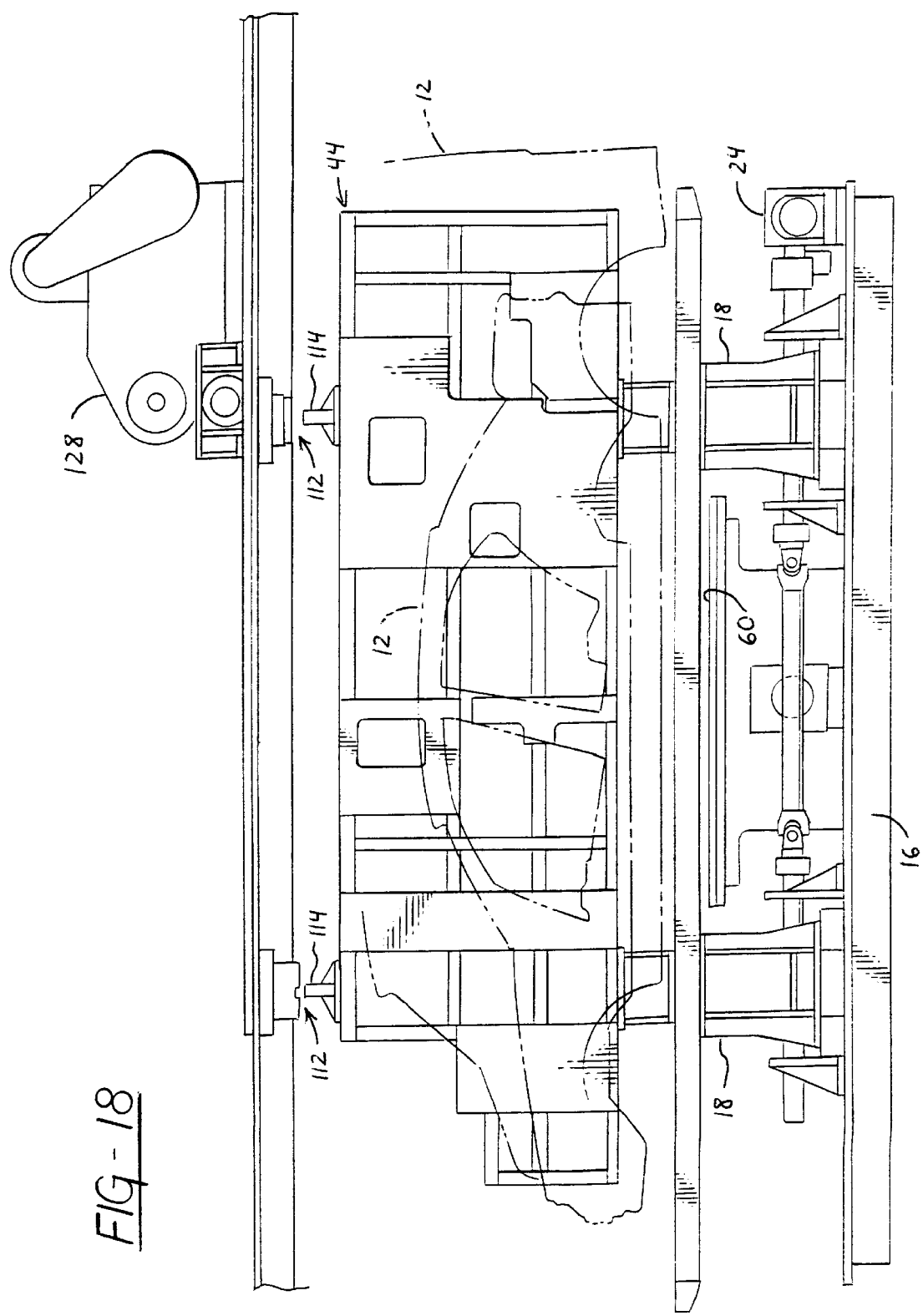
FIG. 18 is a side elevational view of the work station illustrating the balcony-mounted transfer system, the interchangeable gates, the moveable pillars, and lifter unit for transferring the gate assembly from the seated position supported by the pillars to the elevated position engageable with the balcony-mounted transfer unit.

In FIGS. 15 through 18, a balcony-mounted transfer system or indexer 110 is illustrated for moving a gate 44 from the unseated position, illustrated in the upper phantom outline of FIGS. 15 and 16 after being raised by the lift 54, to a changeover position best illustrated in FIGS. 17 and 18. The indexer 110 is positioned above the reciprocal pillars 18 when the pillars 18 are in their first position, spaced transversely from the fixed path 14 of travel through the work station 10. Along the upper portion of each gate 44, locators 112 are provided in longitudinally spaced positions as best illustrated in FIGS. 17 and 18. At least one of the locators 112 on each gate 44 serves to position the gate 44 in the transverse and longitudinal directions. The other locator 112 serves to position the gate in the transverse position while allowing some longitudinal variation to accommodate thermal expansion and retraction or the like. As illustrated in FIGS. 16 through 18, each gate 44 includes a plurality of rollers 62 engageable with the rail 60 formed on the upper surface of the moveable platform 56 of lift 54. As the platform 56 moves from the lower end limit of travel to the upper end limit of travel, the gate 44 is moved from the seated position to the unseated position. Prior to the complete removal of the male portion 50 from the female portion 52 of the locators 48 which attach the gate 44 to the pillars 18, the upper locators 112 become partially engaged with the male portions 114 partially engaged within the female portions 116. Therefore, as the gate 44 is moved between the seated and unseated positions by movement of the lift 54, the gate 44 passes through the transition of having locators 48 fully engaged, followed by having the locators 48 and locators 112 both being partially engaged, and finally having the locators 112 being fully engaged and the locators 48 being fully disengaged when the gate 44 reaches the upper end limit of travel of the lift 54. As illustrated in FIGS. 15 through 18, the male portion 114 of the locator 112 is located on the upper portion of the gate 44, and the female portion 116 of the locator 112 is located on the balcony-mounted transfer system 110. The balcony-mounted transfer system 110 includes an elongate carriage 118 supporting the female portion 116 for reciprocal movement longitudinally and parallel to the fixed path 14. As illustrated in FIGS. 17 and 18, the transfer system or indexer 110 can extend longitudinally on either or both sides of the work station 10, thereby defining a changeover or idle position for one of the gates 44 when the idle gate 44 is not supported by the pillars 18. The gate 44 is moveable by the indexer 110 along the supporting rail 60 of the platform 56 and further along adjacent portions of rail extending longitudinally parallel to the fixed path 14 (not shown). As illustrated in FIGS. 16 through 18, the carriage 118 is driven in movement longitudinally along a path parallel to the fixed path 14 by a drive motor 128. The drive motor 128 rotates a shaft 120 connected through a universal joint 122 to a drive gear 124. The drive gear 124 can be driven in either rotational direction and operably engages a rack 126 connected to the carriage 118. Preferably, the balcony-mounted transfer system 110 is disposed on each side of the fixed path 14 of travel at the work station 10 to provide automated indexing or changing of gates 44 as required to accommodate different vehicle body styles.

In operation, the cyclical operation of the framing apparatus according to the present invention can be described as follows. The drive motor 128 of the balcony-mounted transfer system 110 is activated to carry a supported gate 44 to an unseated position directly above the pillars 18, when the pillars 18 are located in the first position while the lift 54 is located in the upper end limit position. The carriage 118 then stops at the appropriate position with respect to the work station 10, and the lift 54 is actuated to drive the geneva drive 66 to move the lift 54 from the upper position to the lower position to lower the gate 44 onto the pillars 18. As the gate 44 is lowered by the lift 54, the gate 44 is supported on the rail 60 by rollers 62 and the male portions 50 of the locators 48 incrementally engage with the female portions 52 located on the pillars 18, while the male portions 114 of the locators 112 simultaneously incrementally disengage from the female portions 116 connected to the carriage 118. When the lift 54 reaches the lower end limit of travel, the gate 44 is accurately and securely positioned with respect to pillar 18 and is freed from the carriage 118. The pillar 18 is then driven in reciprocal movement from the first position to the second position by the drive motor 24 via shaft 26, lever arm 28, and link 30. This cycle between first and second positions of the simultaneously reciprocal pillars 18 continues as necessary until a new vehicle body style is to be accommodated and a different gate is needed. At that point in time, the pillar 18 is positioned at its first position and the reversible drive motor 64 is actuated to drive the geneva drive 66 to raise the lift 54 from the lower position to the upper position. As the lift 54 moves between the lower position and the upper position, the gate 44 is engaged by the rail 60 via the rollers 62 which are connected to the gate 44. As the gate 44 moves from the seated position to the unseated position, the male portions 50 of the locators 48 incrementally disengage from the female portions 52 while, simultaneously, the male portions 114 of locators 112 incrementally engage with the female portions 116 connected to the carriage 118. When the lift 54 reaches the upper end limit of travel, the male portions 114 of locators 112 are fully engaged within the female portions 116 connected to the carriage 118, and the gate 44 is completely disengaged from the pillars 18, and the male portions 50 of the locators 48 are completely disengaged from the female portions 52 connected to the pillars 18. When in this position, the drive motor 128 for the indexer 110 can be actuated to move the gate 44 in either longitudinal direction to thereby place the gate 44 in an idle or changeover position, while simultaneously moving a new gate 44 into the appropriate position for lowering on the lift 54 and ultimate engagement on the pillars 18. Of course, it should be recognized that the framing apparatus according to the present invention can be practiced without a balcony-mounted transfer system if there is no need or desire to provide for indexing gates with respect to the supporting pillars 18.

According to the present invention, an alternative gate transfer apparatus is illustrated in FIGS. 19 through 30. FIGS. 19 through 30 also generally illustrate a work station 10 adapted to receive a vehicle body 12 which travels along a fixed path 14 through work station 10. As previously explained hereinabove, a pair of pillars 18 may be positioned on either side of the body 12. The pillars 18 are adapted to receive one or more gates 44 which include at least one welder 20 and other fixtures necessary to perform operations on the body 12.

Figure 19:
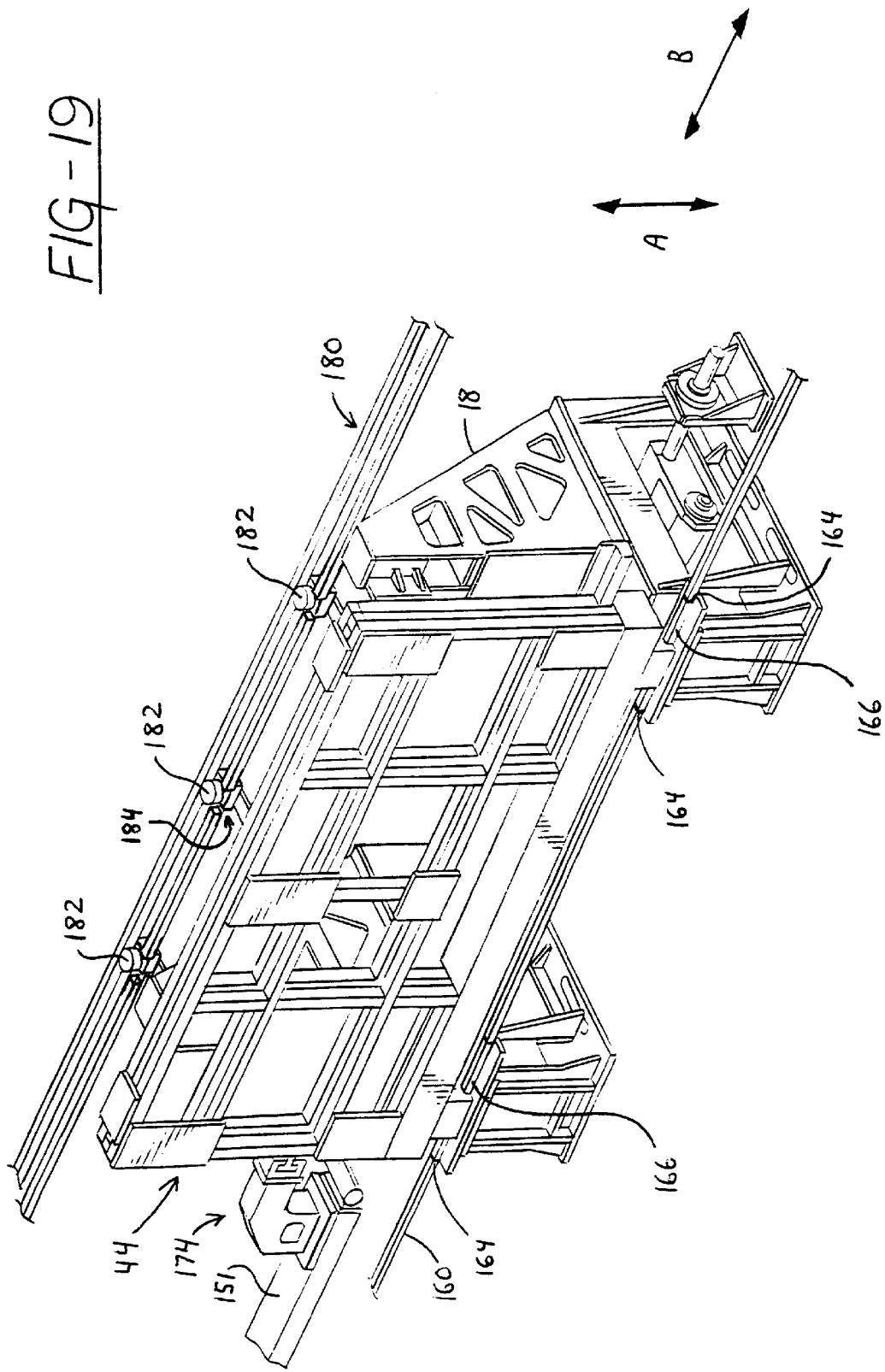
FIG. 19 is a perspective view of an alternative embodiment including a gate transfer apparatus and a gate locating apparatus.
Figure 20:
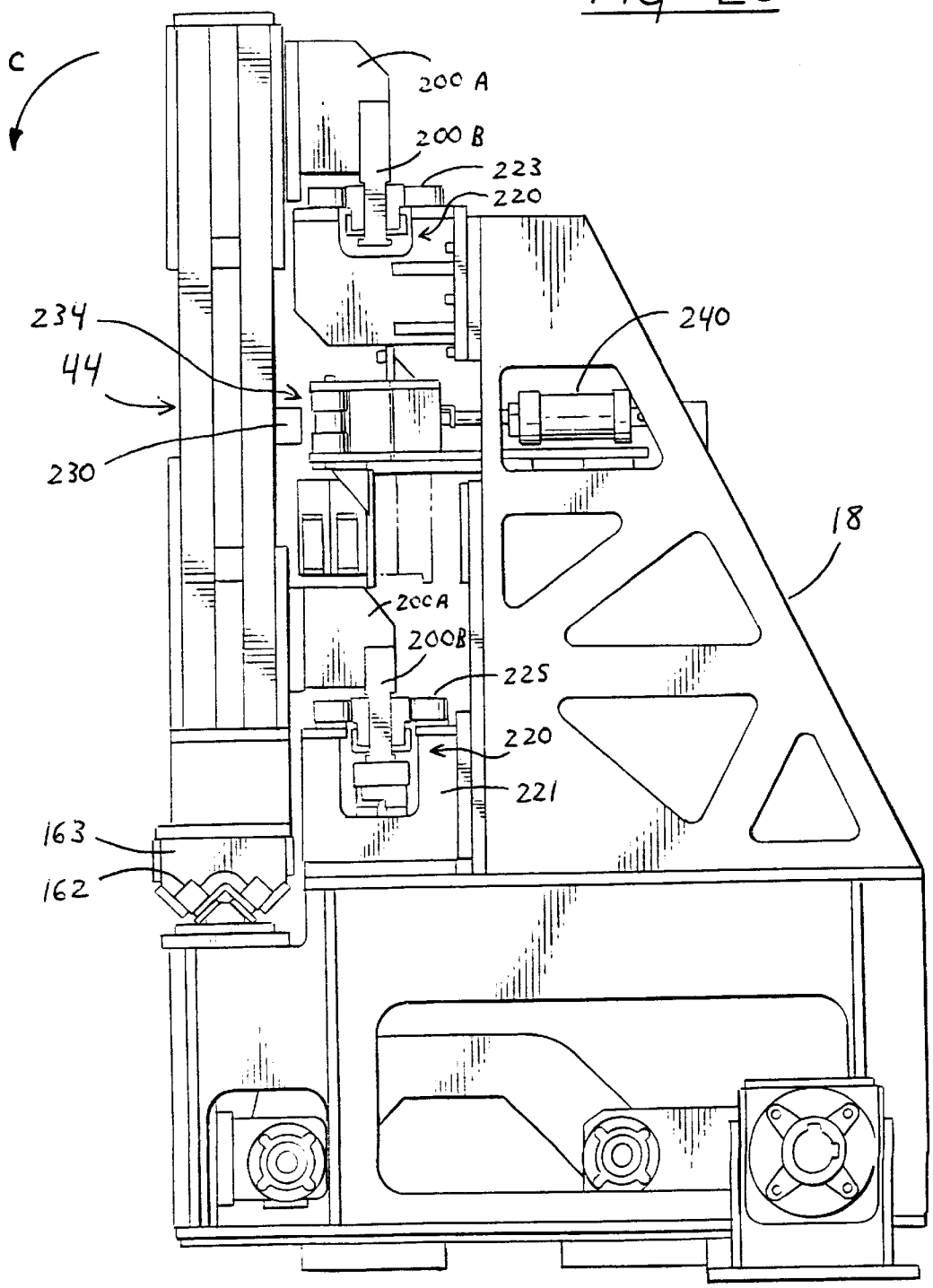
FIG. 20 is an elevational view of a pillar and the gate locating apparatus according to the alternative embodiment.
Figure 21:
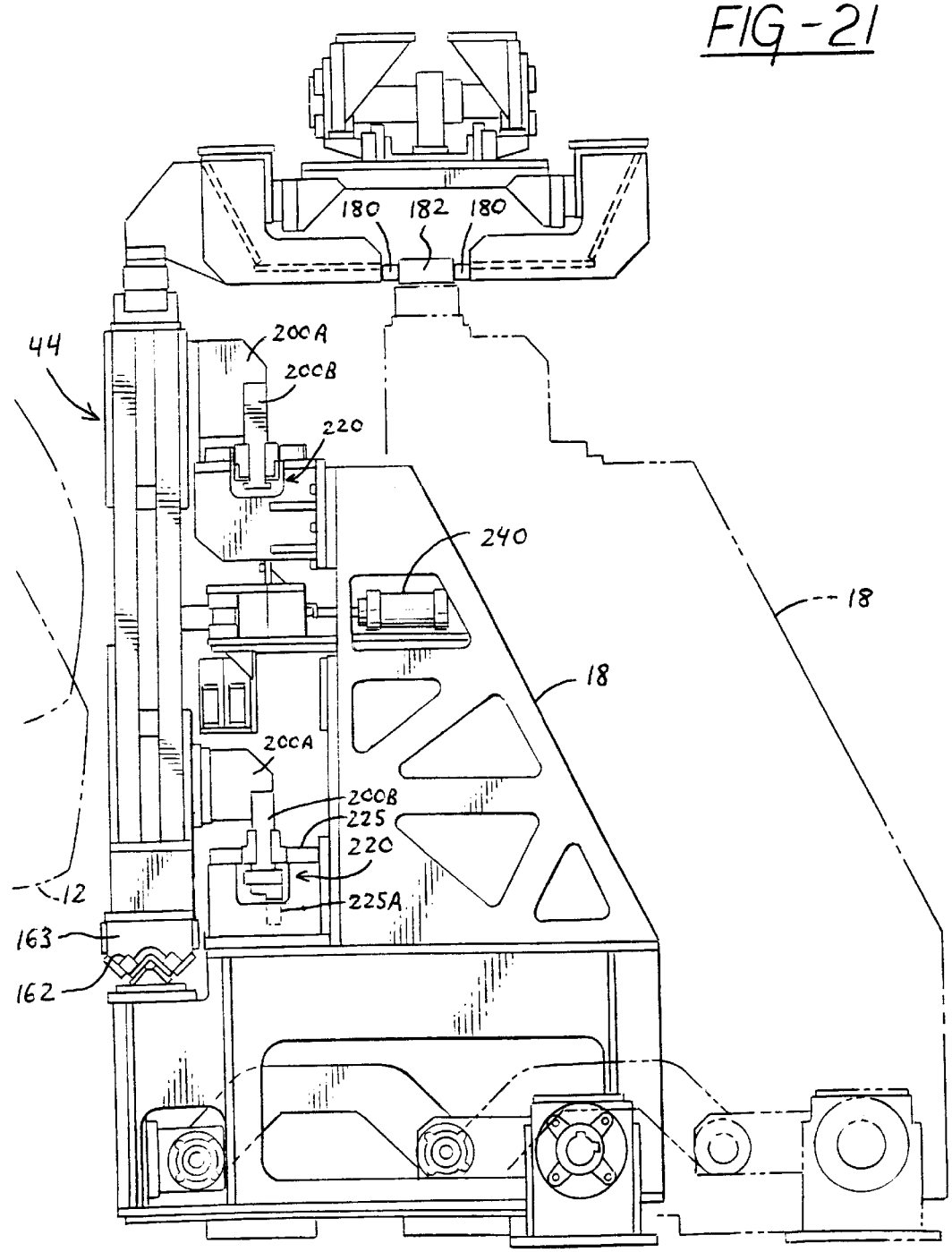
FIG. 21 is an elevational view of a vehicle body at a work station that includes a pillar having a gate locating apparatus, according to the alternative embodiment, coupled with a gate transfer apparatus according to the first embodiment.

The alternative gate transfer apparatus is generally positioned at ground level. As illustrated in FIG. 19, the alternative gate transfer apparatus preferably includes a lower rail 160 and an upper rail 180. Upper and lower rails 160 and 180 serve to guide the gate 44 into and out of engagement with the pillars 18. As illustrated in FIGS. 19, 20, and 24, lower rail 160 includes an angled upper surface forming an inverted V-shaped, cross-sectional configuration. Lower rail 160 is stationary and is supported from the ground by a suitable frame structure. Gate 44 includes a pair of V-rollers 162 positioned on the bottom of the gate 44. V-rollers 162 are adapted to engage lower rail 160 to support the weight of the gate 44 and to guide the gate 44 either toward or away from the pillars 18. V-rollers 162 may be attached to the bottom of the gate 44 in a variety of different ways. One way is to provide a housing 163 in which the rollers 162 are mounted. V-rollers 162 are preferably made of steel, although one of ordinary skill in the art would recognize that other materials, including alloys, may be suitable as well. It is to be understood that the profile of lower rail 160 and the corresponding rollers 162 placed on gate 44 are not limited to a V-shaped configuration. Other configurations would be apparent to those of skill in the art as well. This embodiment supports the weight of the gate 44 primarily on the lower rail 160.

As illustrated in FIGS. 19, 23, 23A, 23B, and 24, the upper rail 180 is preferably a U-shaped channel adapted to receive a plurality of rollers 182. Rollers 182 are positioned on the top surface of gate 44 and are preferably supported by a pin 45. Rollers 182 have an axis of rotation which is generally perpendicular to the ground. Upper rail 180 is stationary and preferably supported from the ceiling with a suitable support structure. Because the weight of gate 44 is supported by the lower rail 160, the necessary support structure holding upper rail 180 in place is reduced.

Figure 22:
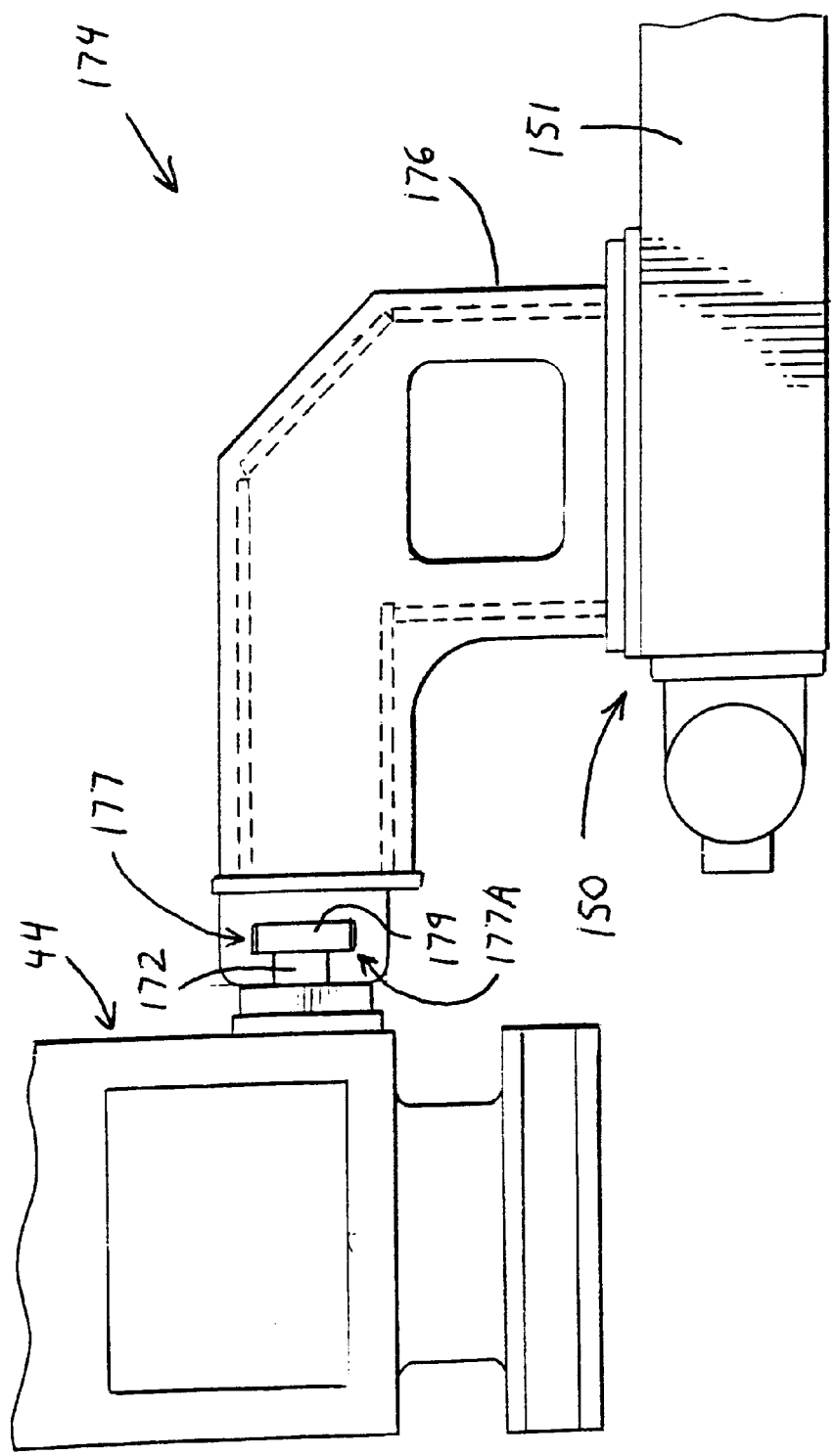
FIG. 22 is a side view of a releasable locking hitch or pin and complementary socket or link used to transfer gates according to the alternative embodiment.

As shown in FIGS. 19 and 22, gate 44 is moved along lower rail 160 and upper rail 180 with the assistance of a drive 150. In this embodiment, drive 150 includes a conveyor belt 151 positioned adjacent lower rail 160. Such a conveyor belt 151, for example, may be a commercially available MARK C conveyor belt. The conveyor belt 151 provides a significant advantage in that it may be precisely controlled. As illustrated in FIG. 22, conveyor belt 151 runs generally parallel with the ground. It is to be understood, however, that conveyor belt 151 may be positioned at any angle with respect to the ground. In addition, a conveyor link 174 is mounted on conveyor belt 151 and operates to drive the gate 44 in either direction into engagement or out of engagement with pillars 18. It is to be understood by those skilled in the art that other types of drive mechanisms may be used to move the gate 44 into and out of engagement with pillars 18.

As illustrated in FIG. 22, conveyor link 174 includes an outwardly projecting arm 176 and a roller pocket 177 attached thereto. Roller pocket 177 includes a pair of rollers 179 and further includes gaps 177A. Gate 44, in turn, includes at least one locking member or pin 172 operative to releasibly engage within the roller pocket 177. Locking pin 172 engages roller pocket 177 by passing into and out of gaps 177A when pillars 18 move from their second position to their first position. Conveyor link 174 and locking pin 172 together act as a trailer hitch and ball to pull or push the gate 44. In this way, when locking pin 172 is engaged with respect to conveyor link 174, conveyor belt 151 operates to pull or push the gate 44 into or out of the gate locating apparatus of pillars 18.

The alternative embodiment also provides structure to permit the gate 44 to disengage from the gate transfer apparatus when the gate 44 has engaged pillars 18 so that pillars 18 can move from the first position to the second position. As illustrated in FIGS. 19 and 24, pillars 18 can include an attached pair of rail segments 166 which are collinear with the stationary lower rail 160 when pillars 18 are in the first position. Rail segments 166 are separated from the stationary rail 160 by splits 164. In this way, when gate 44 is positioned on rail segments 166, pillars 18 can move forward with the gate 44 into the second position.

Figure 23:
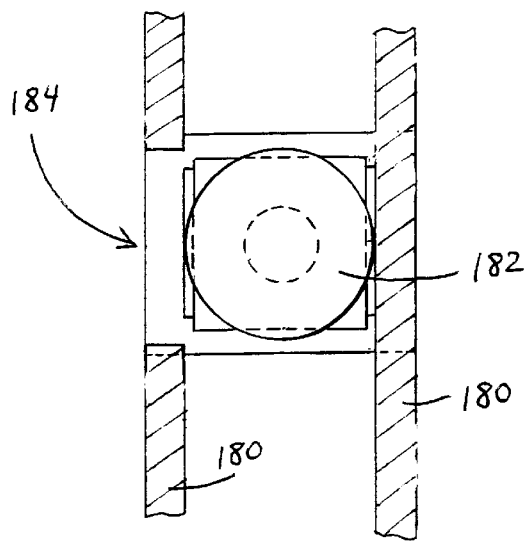
FIG. 23 is a top view of an upper rail associated with the gate transfer apparatus of the alternative embodiment.
Figure 23B:
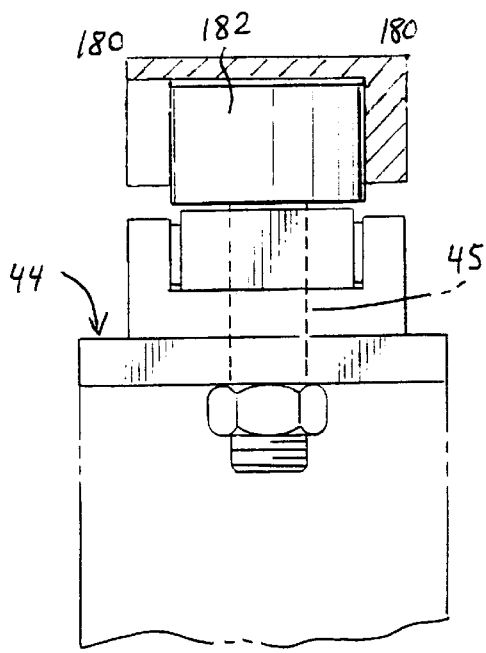
FIG. 23B is a view taken along the lines D—D illustrated in FIG. 23A.
Figure 23A:
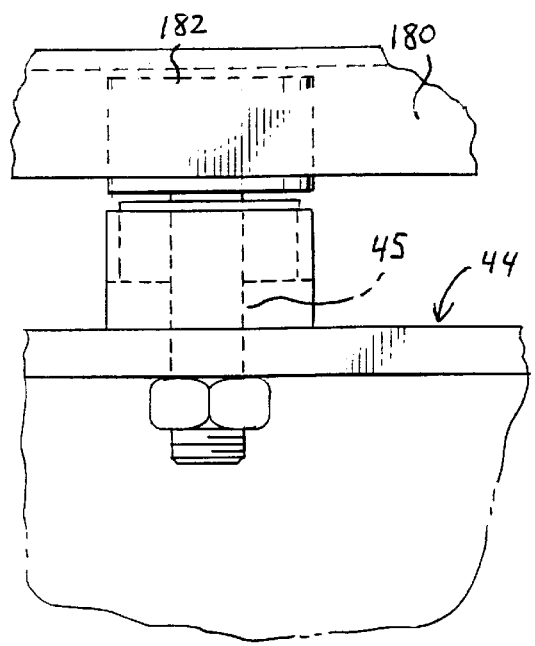
FIG. 23A is a cross-sectional view of the upper rail of the gate transfer apparatus according to the alternative embodiment.

As illustrated in FIGS. 19 and 23, upper rail 180 includes gaps 184 to allow rollers 182 to exit the channel defined by the upper rail 180. Gaps 184 are slightly larger than the diameter of rollers 182 and are positioned in a staggered pattern to align with the rollers only when the gate 44 is in the engaged position on the pillars 18. In a preferred embodiment, gate 44 is configured with three offset rollers 182. This arrangement allows at least two rollers 182 to be engaged within upper rail 180 at one time when gate 44 is not captured by pillars 18. Thus, it is only when gate 44 is captured by pillars 44 that rollers 182 are aligned to be disengaged through the gaps 184 from the upper rail 180. For example, when the trailing roller of rollers 182 passes across one of the gaps 184 during the process of removing gate 44 from pillars 18, the two leading rollers of rollers 182 will remain engaged within the upper rail 180.

The present invention can include a second gate locator. The second gate locator locates and/or positions the gate in a vertical position indicated by arrows A in FIG. 19, a fore and aft position indicated by arrows B in FIG. 19, and fixes the angle at which the gate 44 rests with respect to the ground as indicated by arrow C in FIG. 19. The second gate locator is illustrated in FIG. 19, and FIGS. 24 through 30. In general, gate 44 is located vertically and the angle of the gate with respect to the ground is fixed when a plurality of locating segments 200, positioned on the gate 44, engage a plurality of corresponding roller pockets 220 positioned on pillars 18. Gate 44 is configured to include a plurality of locating segments 200 positioned at the top fore position of gate 44, at the bottom fore position of gate 44, at the top aft position of gate 44, and at the bottom aft position of gate 44 respectively.

Figure 25:
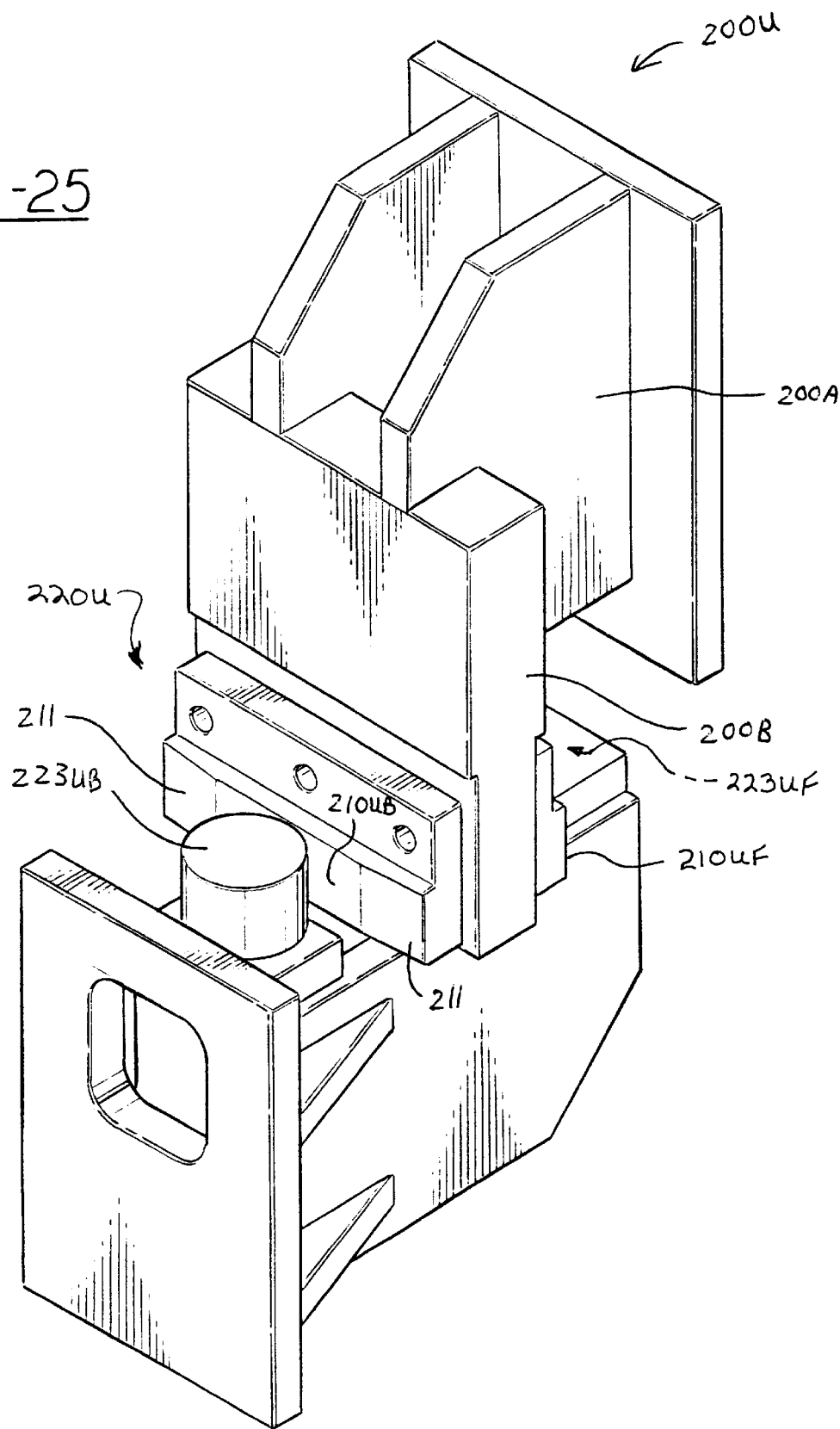
FIG. 25 is a detailed, exploded view of a top roller pocket and a locating segment of the gate locating apparatus, according to the alternative embodiment.

Each locating segment 200 is adapted to engage the corresponding complementary roller pocket 220 positioned on one of the pillars 18 to locate the gate 44 vertically and/or fore and aft with respect to the pillar. As shown in FIG. 25, upper locating segments 200U each include an extension 200A extending away from the gate 44 and further include a downwardly projecting member 200B which slides into one of the upper corresponding complementary roller pockets 220. Preferably, the downwardly projecting member 200B includes a pair of engaging surfaces 210UB, 210UF which contact upper back and front rollers 223UB, 223UF in upper roller pockets 220U. Engaging surfaces 210UB, 210UF each preferably include ramps 211 which facilitate the reception of engaging surfaces 210UB, 210UF into the upper roller pockets 220U. Rollers 223UB, 223UF positioned in roller pockets 220U, and locating segments 200U are both preferably constructed with steel. Thus, it is to be understood that the dimensions of the locating segments 200U and, in particular, the engaging surfaces 210UB, 210UF must be accurately dimensioned to engage between rollers 223UB, 223UF to precisely locate the gate 44 with respect to the pillars 18 in a repeatable manner. Such an arrangement provides solid, repeatable placement of the gate 44 on the pillars 18.

Figure 26:
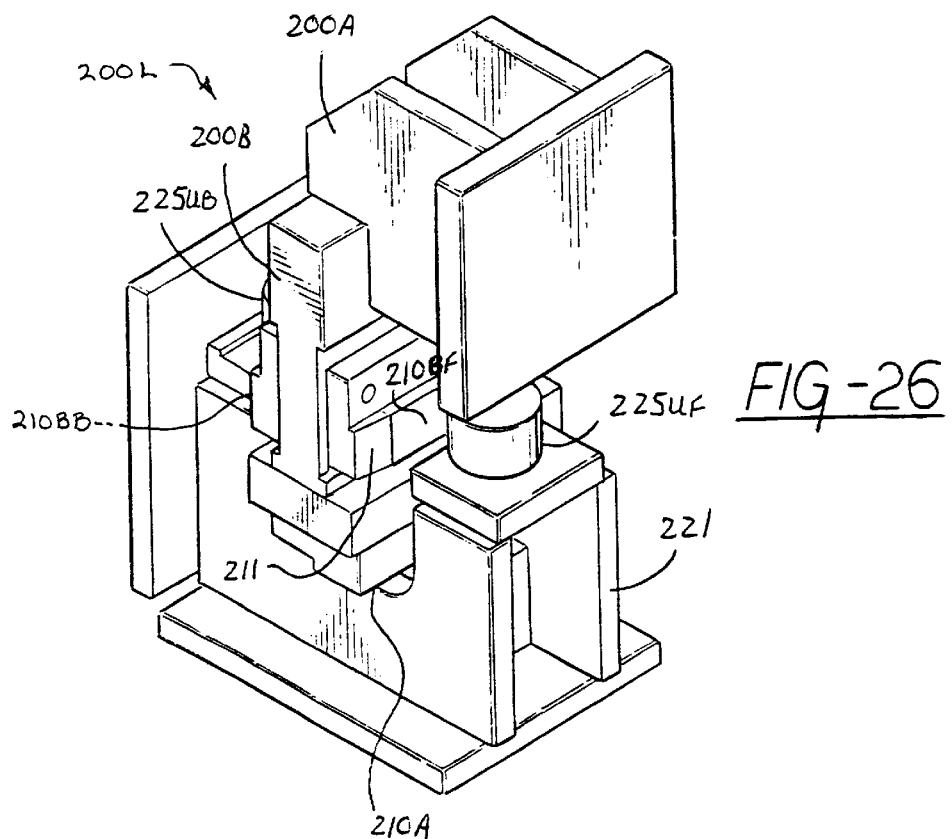
FIG. 26 is a detailed, perspective view of a lower roller pocket and a locating segment of the gate locating apparatus, according to the alternative embodiment.

As illustrated in FIGS. 24 through 26, top or upper roller pockets 220U include a pair of rollers 223UB, 223UF, while lower or bottom roller pockets 220B include three rollers 225BB, 225BF and 225A, each of which is mounted within a roller housing 221. As illustrated in FIGS. 24 and 26, the bottom fore and aft locating segments 200B also preferably include engaging surfaces 210BB, 210BF and 210A adjacent the bottom of gate 44. Engaging surfaces 210BB, 210BF and 210A function in combination with bottom rollers 225BB, 210BF and 225A to precisely locate the front and back position and the vertical position of the gate 44. Bottom engaging surfaces 210BB, 210BF and 210A also include ramps 211 which operate to engage lower rollers 225BB, 225BF and 225A to lift gate 44 off of rail segments 166. Preferably, ramps 211 operate to lift gate 44 only a few millimeters, such as, for example, 2 millimeters, off of rail segments 166 to accurately set the vertical position of gate 44.

Figure 27:
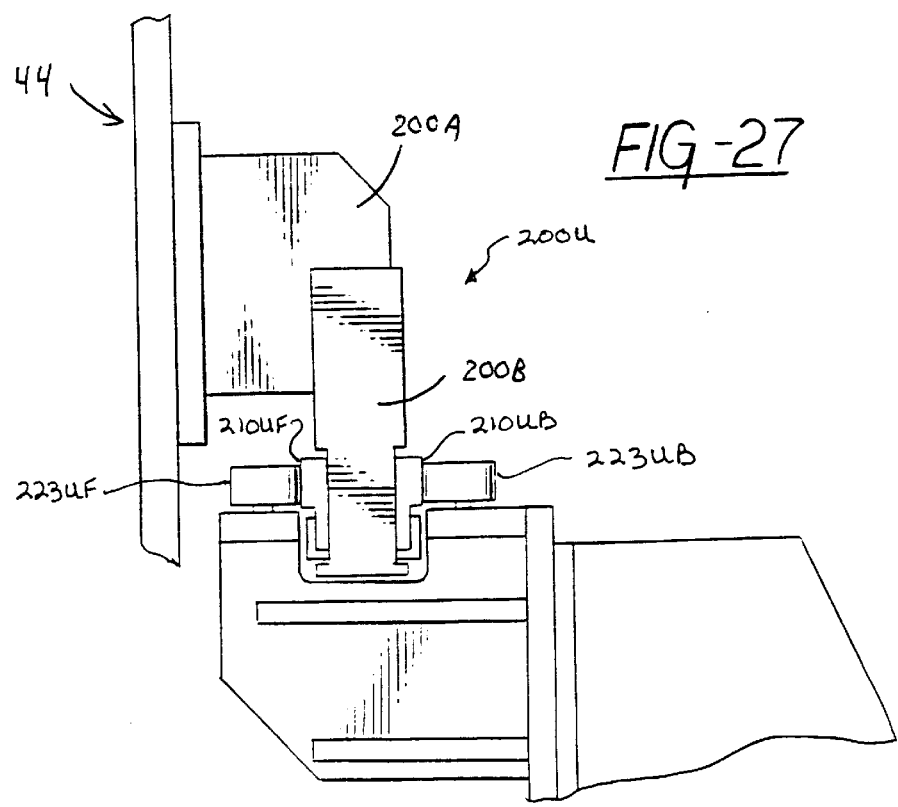
FIG. 27 is a detailed, elevational view of the top roller pocket and a locating segment of the gate locating apparatus, according to the alternative embodiment.
Figure 28:
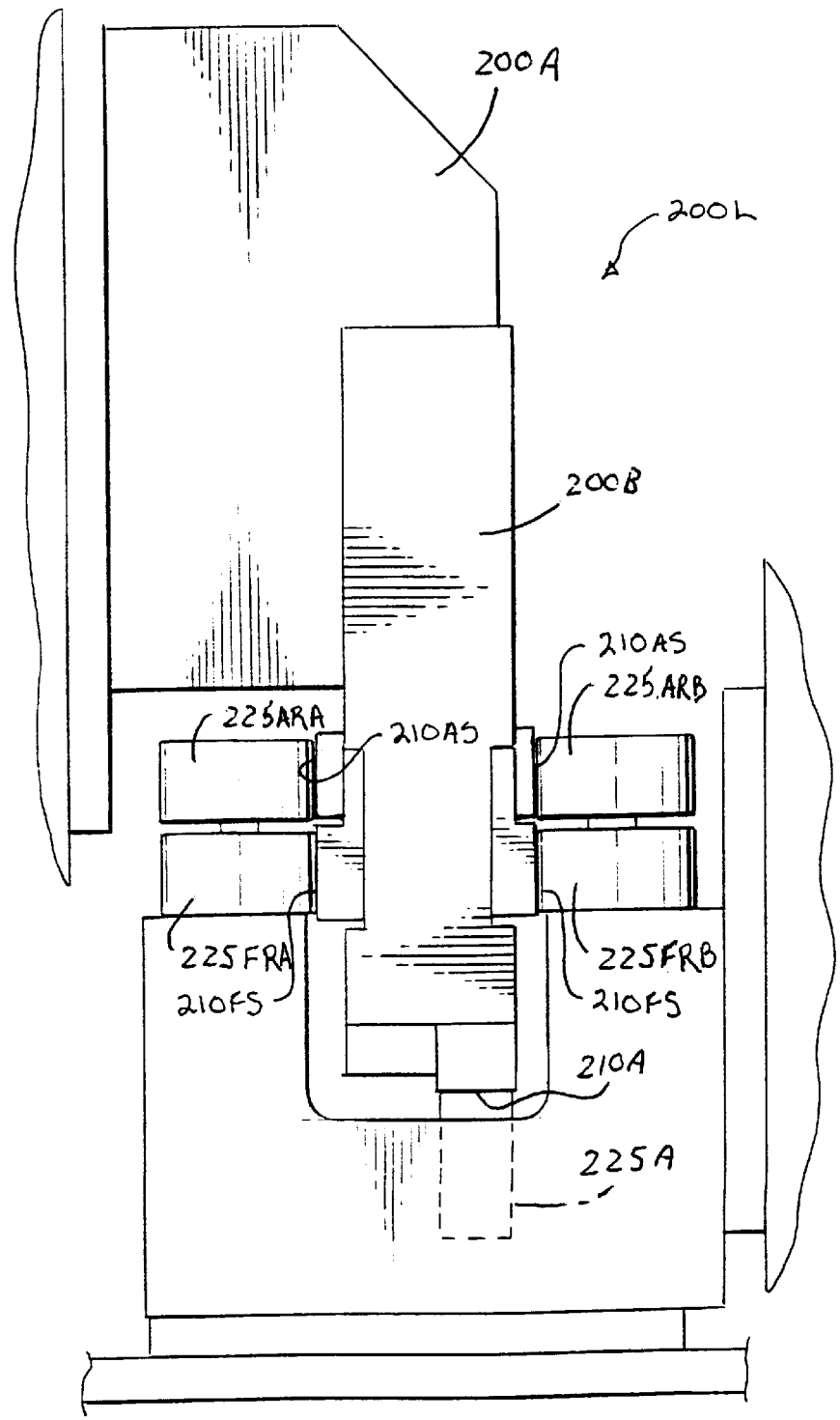
FIG. 28 is a detailed, elevational view of the lower roller pocket and the lower locating segment of the gate locating apparatus, according to the alternative embodiment.

As illustrated in FIGS. 24, 27, and 28, the fore and aft rollers 223UB, 223UF and 225BB, 225BF corresponding to the upper and bottom of gate 44 are offset with respect to one another so that the engaging surfaces 210UB, 210UF of the aft locating member 200B are offset or not aligned with the engaging surfaces 210UB, 210UF of the fore locating member 200B. Similarly, top fore and top aft, as well as, bottom fore and bottom aft engaging surfaces 210UB, 210UF, 210BB, 210BF are offset. Offsetting the fore and aft engaging surfaces 210 and fore and aft rollers 223 and 225 allows the fore engaging surfaces 210 to freely pass by the aft rollers 223 and 225 during loading and unloading of the gate 44 with respect to the pillar 18. This is illustrated in FIG. 28 where the fore and aft engaging surfaces are labeled 210FS and 210AS respectively, and fore rollers are labeled 225FRA and 225FRB and the aft rollers are labeled 225ARA and 225ARB. This offset configuration provides an efficient way to engage and disengage gate 44 from pillars 18 since the engaging surfaces 210 do not encounter resistance until they engage their corresponding roller pockets 220. This also reduces wear on the locating surfaces.

Figure 29B:
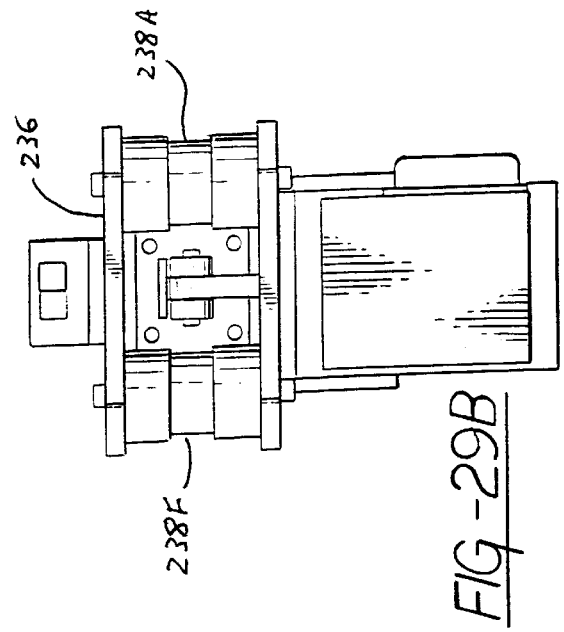
FIG. 29B is an elevational view of FIG. 29.
Figure 29:
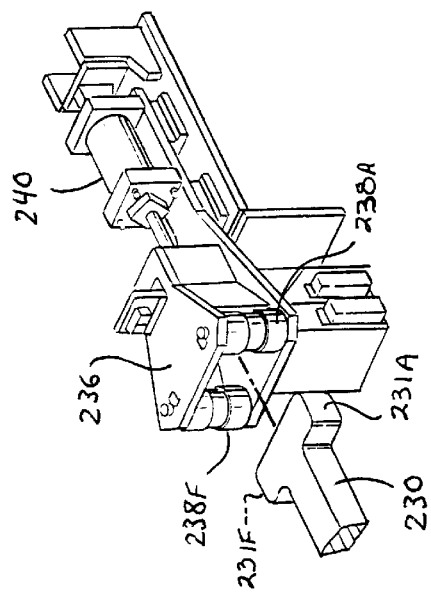
FIG. 29 is a detailed, perspective view of a fore/aft lock in the gate locating apparatus, according to the alternative embodiment.
Figure 29A:
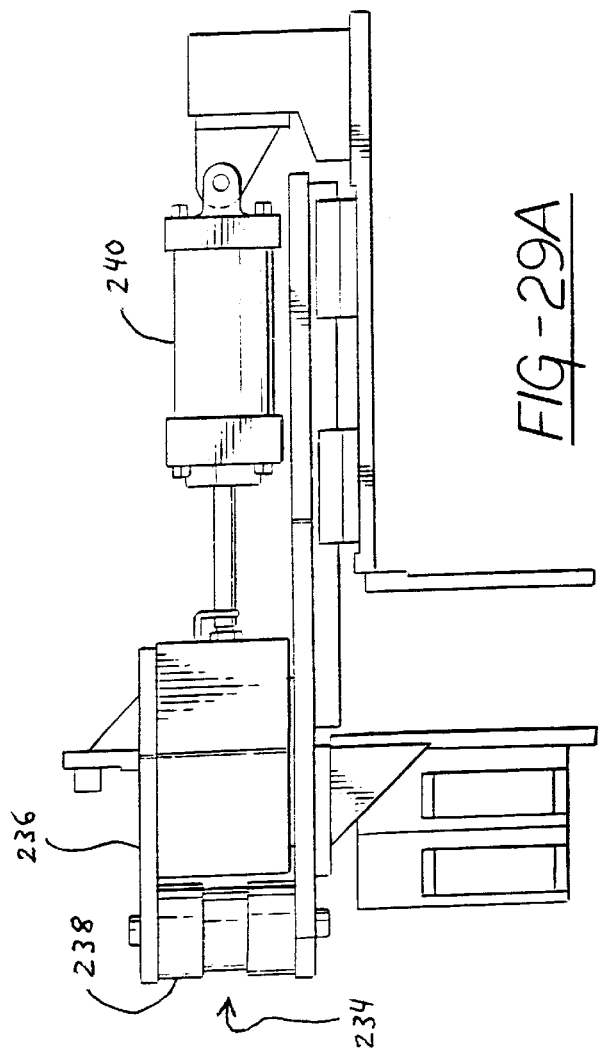
FIG. 29A is a side elevational view of FIG. 29.
Figure 30:
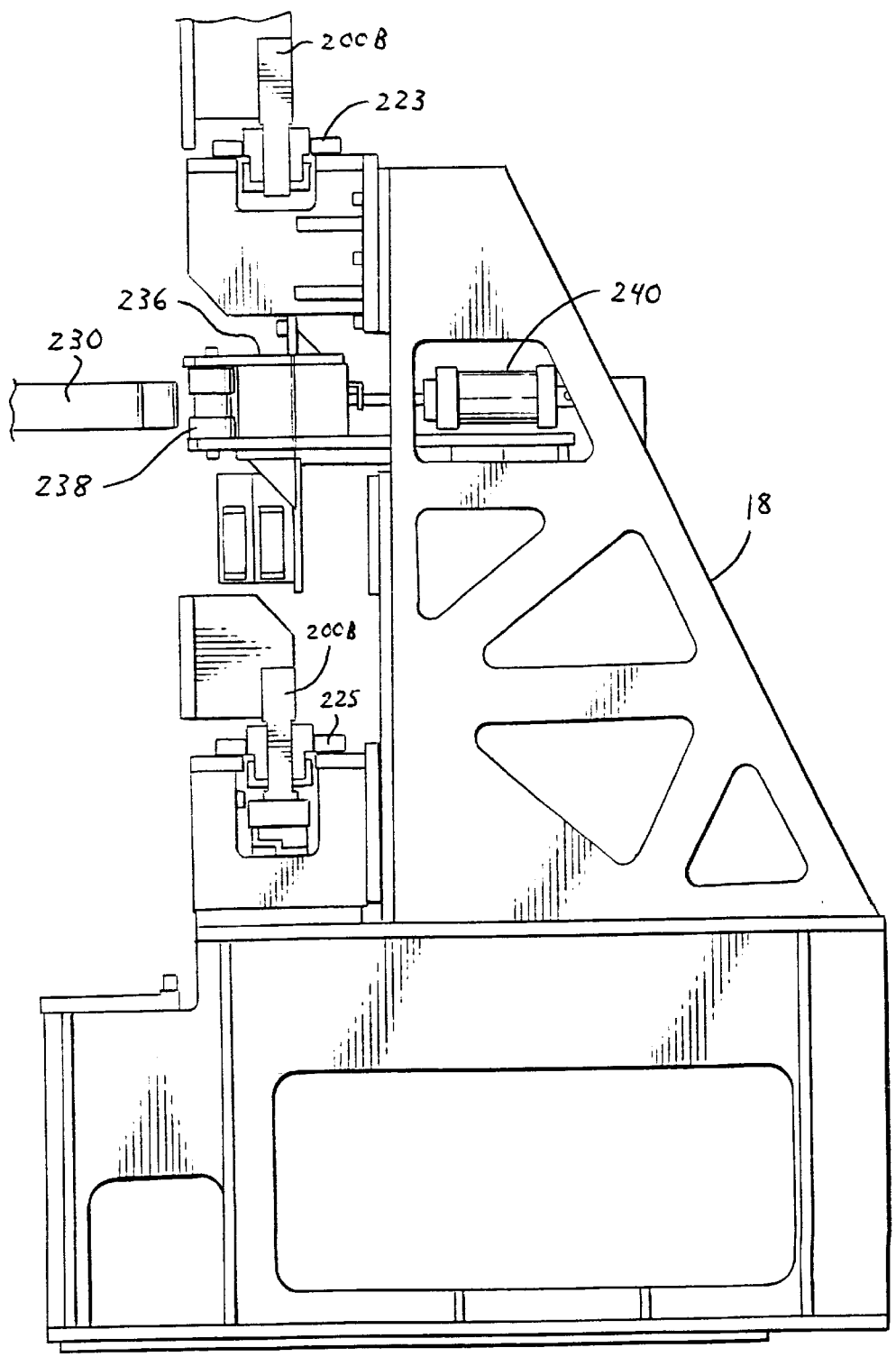
FIG. 30 is an elevational view of the gate locating apparatus, according to the alternative embodiment.

According to the present invention, the alternative embodiment also includes a fore/aft locking member. In particular, as illustrated in FIGS. 29 and 30, gate 44 includes a fore/aft locking pin 230. Locking pin 230 engages movable roller pocket 234 to engage the fore/aft locating surfaces 231F, 231A. Movable roller pocket 234 includes a pair of rollers 238F, 238A mounted within a body 236. A cylinder 240 is operative in moving roller pocket 234 outward to engage the fore/aft locating surfaces 231F, 231A of locking pin 230. The fore/aft locating surfaces 231F, 231A of locking pin 230 preferably includes beveled edges 232 to facilitate capturing the pin 230 within the moveable pocket 234. The locking pin 230, when engaged, prevents gate 44 from moving in a fore or in an aft direction and locating surfaces 231F, 231A precisely locate the gate 44 in the fore and aft direction with respect to the pillars 18. It is to be understood by one of ordinary skill in the art that the fore/aft locating and locking mechanism can be implemented in any of a number of different configurations. For example, a locking pin with locating surfaces could be supported from the pillars 18 and could engage a roller pocket positioned on the gate 44.

During operation of the alternative embodiment, conveyor belt 151 and connected drive link 174 operably engage with the drive pin 172 positioned on gate 44 when the pillars are in the retracted position, to push gate 44 along lower and upper rails 160 and 180 toward pillars 18 while pillars 18 are in the retracted or first position. When pillars 18 are in the first position, rail segments 166 are collinear with the stationary lower rail 160. As gate 44 travels toward pillars 18, the fore engaging surfaces 210UB, 210UF of the fore locating segments 200U, 200B pass the aft roller pockets 220U, 220B as a result of being offset from the aft rollers 223UB, 223UF and 225UB, 225BF. Top and bottom fore engaging surfaces 210UB, 210UF, 210BB, 210BR of locating segments 200U, 200B then engage top and bottom fore roller pockets 220U, 220B. Simultaneously, aft engaging surfaces 210UB, 210UF, 210BB, 210BR of aft locating segments 200U, 200B engage aft roller pockets 220U, 220B. The bottom engaging surfaces 210A ramp onto the bottom rollers 225A of bottom roller pockets 220B to vertically position the gate 44.

In FIGS. 23 through 26, 29, and 30, movable roller pocket 234 moves forward to engage the fore/aft locating surfaces 231F, 231A of locking pin 230 positioned on gate 44. After gate 44 is located on pillars 18, pillars 18 move forward from the first position into the second position. Necessary welding and/or other operations can be performed on the vehicle body 12 when the pillars 18 are in the second position. When pillars 18 move forward, upper rollers 182 pass through the gaps 184 in the upper rail 180 and are thereby disengaged from the upper rail 180. It is to be understood that each engaging surfaces 210 is sufficiently long in length so that when upper rollers 182 approach gaps 184, the engaging surfaces 210 are captured in the respective roller pockets 220, such that gate 44 is always captured within either the gate transfer apparatus or by pillars 18. The rail segments 166 separate from the stationery lower rail 160 as the gate 44 moves forward to its second position. In the second position, the appropriate welding or other operations can be performed on the vehicle body 12 by the devices positioned on gate 44 or by robotic devices located at the work station.

Gate 44 is removed from pillars 18 and taken away in the opposite manner as described hereinabove. More particularly, the pillars 18 retract back to the First position and upper rollers 182 pass back through gaps 184 into upper rail 180 and are re-engaged with upper rail 180 as the gate 44 is moved away from the pillar 18. Rail segments 166 also then become collinear with the lower rail 160, and locking pin 172 of the gate 44 is engaged with drive link 174. Gate 44 can include locking pins 172 at both the fore and aft locations. In this way, when one gate 44 is being pushed by conveyor belt 151 toward pillars 18 from one direction, another gate 44 can simultaneously be pulled by another conveyor belt out of engagement with pillars 18 from the opposite direction. Lower and upper rails 160 and 180 may include switches to allow different gates to enter and exit engagement with pillars 18.

The present invention includes many significant advantages, not the least of which is that the great majority of the superstructure typically positioned about pillars 18 is now removed and is no longer necessary. This will allow robots or others devices additional clearance to access the vehicle body 12 from the sides and/or from a gantry above the work station. It is to be also understood that drive link 174 can be moved into and out of position when pillars 18 are in the first position to provide even greater clearance for robots to access the body 12.

Figure 31:
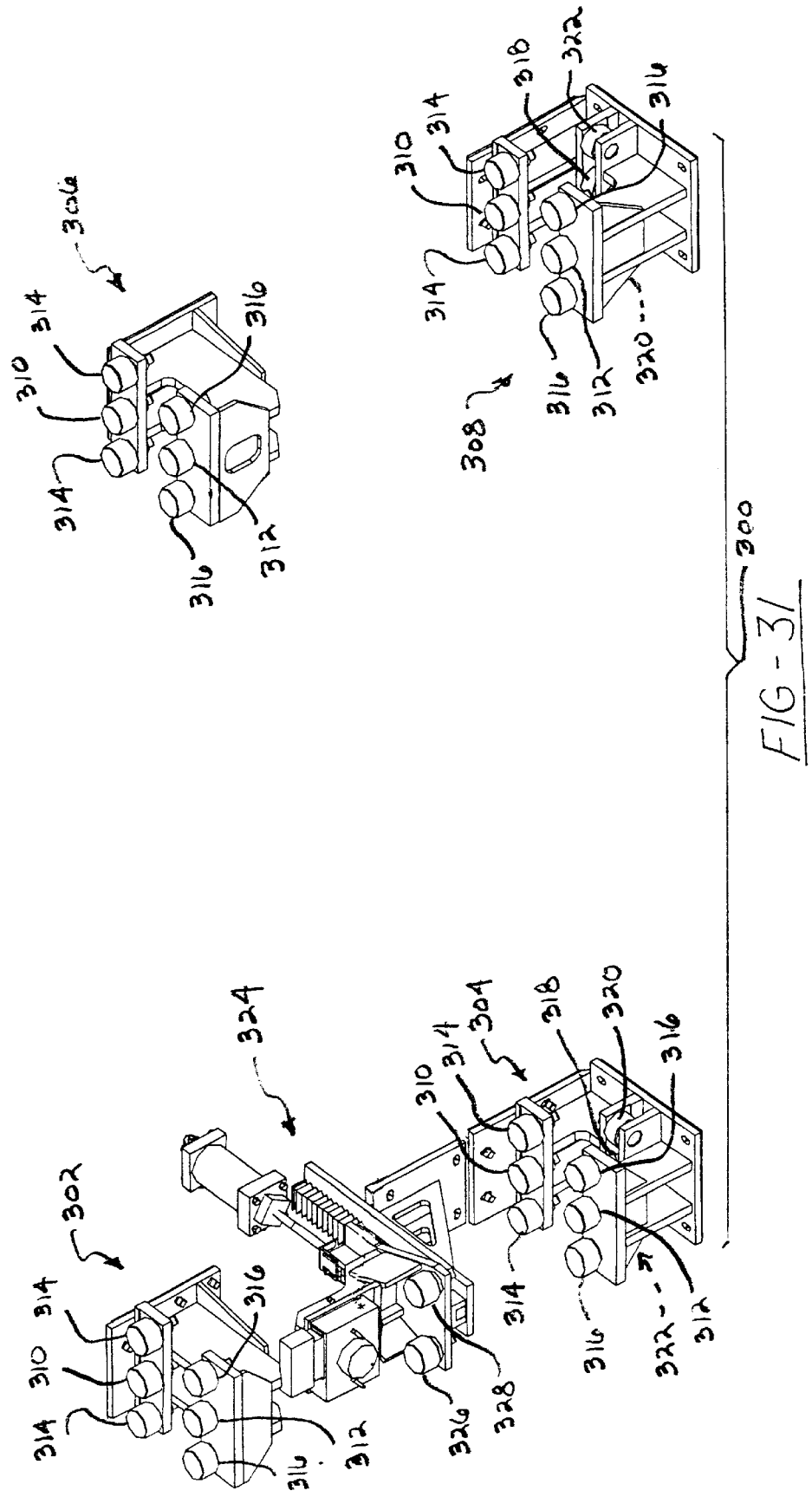
FIG. 31 is a perspective view of a preferred embodiment of gate locating means according to the present invention.

Referring now to FIG. 31, the preferred embodiment of the gate locating means is shown in perspective view with all other structure removed for purposes of clarity. The gate locating means 300 includes a plurality of roller pockets 302, 304, 306, 308. Each of the roller pockets 302, 304, 306, 308 includes opposing locating rollers 310, 312 disposed adjacent a central portion of the corresponding pocket 302, 304, 306, 308. In addition, opposing alignment rollers 314, 316 are positioned on at least one side of the locating rollers 310, 312, and preferably on both sides of the opposing locating rollers 310, 312 in order to align locating surfaces of the gate prior to engagement with the locating rollers 310, 312. Positioning the opposing alignment rollers 314, 316 on both sides of the locating rollers 310, 312 reduces wear on the locating rollers 310, 312 by aligning the gate with the locating rollers 310, 312 prior to contact with the locating surfaces of the gate (not shown in FIG. 31). This configuration will provide alignment of the gate prior to engagement with the locating rollers 310, 312 when the gate is being loaded onto the pillars from either side or direction.

Each of the lower roller pockets 304, 308 includes a positioning roller 318 for lifting the gate vertically into a predetermined position. Preferably, the positioning roller 318 is located adjacent to the center portion of each of the lower roller pockets 304, 308. Preferably each of the lower roller pockets 304, 308 also includes at least one guarding roller, and most preferably two guarding rollers 320, 322, with one guarding roller disposed on each side of the positioning roller 318 to act as an upstream guarding roller and a downstream guarding roller to reduce the wear on the positioning roller 318 disposed therebetween. As the locating surface of the gate approaches one of the lower pockets 304, 308, the lower locating surface of the gate engages first with one of the guarding rollers 320, or 322, prior to being positioned in the predetermined vertical position lifted slightly from the guide rail by the positioning roller 318. Simultaneously, the vertically extending locating surfaces of the gate engage first with the opposing alignment rollers 314, 316 prior to being finally located in the desired predetermined location on the pillars by the locating rollers 310, 312 in each of the roller pockets 302, 304, 306, 308. This configuration accurately positions the gate in two dimensions with respect to the pillar support structure.

The gate is also positioned with respect to a third axis by engagement with the movable roller pocket 324. The movable roller pocket 324 preferably includes opposing position-capturing rollers 326, 328 for operably engaging locating surfaces formed on the gate extending in a direction preferably normal to both the locating surfaces on the gate operably engagable with the locating rollers 310, 312 and the locating surface engagable with the positioning roller 318. As the movable roller pocket 324 is reciprocated into engagement with the locating surfaces on the gate, the gate is captured along the third axis to accurately position the gate in three dimensions with respect to the pillar. Further alignment of the gate with respect to the work station is not required. This reduces the amount of wear on the alignment rollers, since multiple vehicle bodies are processed at the work station prior to changing the gate for another body style configuration. Prior known devices require alignment of the gate when closing or approaching with respect to the vehicle body at the work station, and therefore wear occurs on the alignment mechanisms for every single vehicle body welded. In the present invention, wear occurs on the aligning, locating and capturing rollers only when the gate is changed on the pillars. Since the position of the pillars in the closed orientation is known, further locating of the gate with respect to the automotive body is not required for each vehicle body to be welded. This increases the dimensional accuracy and repeatability of the present invention over that possible with the prior known devices. The present invention is capable of reaching tolerances, even with repetitive gate changeovers over extended periods of time beyond, that capable of the prior known devices.

Referring now to FIG. 32, the preferred embodiment of the gate transfer means 330 is shown in exploded perspective view with other portions of the present invention removed for clarity. In the illustration of FIG. 32, the gate is schematically shown as 44 and would be positioned on the pillars (not shown in FIG. 32) waiting for reciprocation of the pillar toward the vehicle body to be welded. Movement toward the vehicle body would be toward the lower left as illustrated in FIG. 32. A frame 332 supports the rail 334 carrying the gate 44. The gate 44 is movably supported on the rail 334 by roller bearings 336. A drive engaging member 338 is connected to the gate 44 for slidable engagement with a slot 340 connected to a carriage 342 for driving the gate 44 in reciprocal movement along the rail 334. The drive engaging member 338 is in operable engagement with the slot 340 when the pillar is in the retracted position spaced away from the fixed path of travel of the vehicle body. When in this retracted position, the drive engaging member 338 is disposed operably within the slot 340 allowing the carriage 342 to move the gate 44 off from the pillars (not shown) and on to the rail 334 into a standby location toward the upper left as illustrated in FIG. 32. When this gate 44 is required again, the carriage 342 drives the gate 44 from the standby position on rail 334 on to the pillar and into a ready location. The drive engaging member and slot allow the pillars to reciprocate the gate toward the fixed path of the vehicle body for clamping the vehicle body to perform welding operations at the work station. Reciprocation of the gate 44 slides the drive-engaging member out of the slot until the gate 44 is returned to the retracted position by the pillars. It should be recognized that the drive engaging member 338 could be connected to the carriage, while the slot 340 could be formed on the gate without departing from the spirit and scope of the present invention.

The gate 44 can also include a slot 344 for receiving a lock member (not shown). The lock member can prevent the gate from moving along the rail or moving with respect to the pillars beyond a limited range of movement required for positioning of the gate as the gate is engaged by the movable roller pocket 324, as previously described. The lock member can be reciprocal into and out of engagement with the slot 344 formed on the gate 44 in order to prevent the gate from being dislodged from the pillars when not engaged and driven by the carriage 342.

While the present invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the claims of the present invention, which scope is to be accorded the broadest interpretation so as to encompass all such modifications and equivalent structures as is permitted under the law.

What is claimed is:

1. In an apparatus for supporting a frame for movement relative to a workpiece to be processed at a work station, the improvement comprising:

at least two moveable pillars on each side of a fixed path of travel through the work station for synchronized reciprocation between first and second end limits of travel toward and away from the fixed path of travel of the workpiece;

at least one gate connectible in a repeatable located position with respect to the moveable pillars on each side of the fixed path for synchronized reciprocation between first and second positions toward and away from the fixed path of travel of the workpiece;

gate drive means engageable with a registered gate located in the repeatable located position on the at least two pillars for moving the registered gate alone the fixed path of travel of the workpiece to remove the registered gate from the at least two pillars, and engageable with a replacement gate for moving the replacement gate into registry with the at least two pillars in the repeatable located position as the previously registered gate is removed; and locating means engageable between each pillar and the corresponding gate for locating the gate with respect to the moveable pillar in at least two dimensions.

2. The improvement of claim 1 wherein the locating means further comprises:

at least two vertically spaced locators on each pillar for defining a vertical position and a horizontal position along an axis normal to the fixed path.

3. The improvement of claim 2 wherein the locating means further comprises:

the vertically spaced locators on one pillar offset with respect to the vertically spaced locators on the other pillar, such that the gate engages with the vertically spaced locators on each pillar only when immediately adjacent the repeatable located position.

4. The improvement of claim 2 wherein each of the vertically spaced locators further comprises:

a pocket defined by at least two locating rollers having vertical axes of rotation spaced horizontally from one another a sufficient distance for receiving at least one vertically extending locator surface releasibly between the two rollers.

5. The improvement of claim 4 wherein each of the locating rollers has a leading alignment roller and a trailing alignment roller for aligning the vertically extending locator surface with the locator rollers prior to engagement between the locator rollers and the locator surface.

6. The improvement of claim 2 wherein at least one of the vertically spaced locators on each pillar further comprises:

at least one locating roller having a horizontal axis of rotation for releasibly engaging a horizontally extending locator surface.

7. The improvement of claim 6 wherein the locating roller has a leading alignment roller and a trailing alignment roller for aligning the horizontally extending locator surface with the locator roller prior to engagement between the locator roller and the locator surface.

8. The improvement of claim 1 wherein the locating means further comprises:

a moveable locator for locating the gate in a predetermined position along an axis parallel with respect to the fixed path of travel of the workpiece when the moveable locator is in a first position and for allowing movement of the gate with respect to the pillars when the moveable locator is in a second position.

9. The improvement of claim 8 wherein the moveable locator further comprises:

a pocket defined by at least two locating rollers having vertical axes of rotation spaced horizontally from one another a sufficient distance for receiving at least one vertically extending locator surface releasibly between the two rollers.

10. The improvement of claim 1 further comprising:

means for indexing a gate between a ready position corresponding to the repeatable located position on the pillars and a standby position spaced from the pillars.

11. In an apparatus for supporting a frame for movement relative to a workpiece to be processed at a work station, the improvement comprising:

a base frame extending transversely with respect to a fixed path of travel at the work station, the workpiece accurately positionable with respect to the base frame at the work station;

at least one pillar on each side of the fixed path of travel at the work station and mounted on the base frame for reciprocal movement transversely with respect to the fixed path of travel, each pillar moveable between a first position allowing entry and accurate positioning of the workpiece with respect to the base frame and allowing entry of other components into the work station, and a second position for accurately locating and clamping the other components with respect to the workpiece;

at least one gate connectible in a repeatable located position with respect to the moveable pillar on each side of a fixed path of travel of the workpiece for synchronized reciprocation between first and second positions toward and away from the fixed path of travel of the workpiece;

gate drive means engageable with a registered gate located in the repeatable located position on the at least one pillar for moving the registered gate along the fixed path of travel of the workpiece to remove the registered gate from the at least one pillar, and engageable with a replacement gate for moving the replacement gate into registry with the at least one pillar in the repeatable located position while the previously registered gate is removed; and at least one welder on each side of the fixed path of travel for fixedly connecting the other components to the workpiece at the work station while the pillars are in the second position.

12. The system of claim 11 further comprising:

at least one rail on each side of the fixed path of travel for guiding the pillar in movement between the first and second positions.

13. The system of claim 11 further comprising:

at least one drive on each side of the fixed path of travel for reciprocally moving the pillar between the first and second positions.

14. The system of claim 11 further comprising:

at least one gate on each side of the fixed path of travel and supportable on the pillar for movement between the first and second positions.

15. The system of claim 14 further comprising:
at least one lift on each side of the fixed path of travel for moving the gate from a seated position supported by the pillar to an unseated position disengaged from the pillar, the lift engageable with the gate when the pillar is in the first position.

16. The system of claim 15 wherein the lift further comprises:
a geneva drive for moving the gate vertically between the seated position and the unseated position.

17. The system of claim 16 wherein the geneva drive further comprises:
a roller cartridge removable radially with respect to a rotational axis of a drive shaft.

18. The system of claim 15 further comprising:
at least one indexer on each side of the fixed path of travel for moving the gate from the unseated position to a changeover position.

19. The system of claim 14 further comprising:
at least one locator on each gate for accurately positioning the gate with respect to the pillar.

20. In an apparatus for supporting a frame for movement relative to a workpiece to be processed at a work station, the improvement comprising:
at least two moveable pillars on each side of a fixed path of travel through the work station for synchronized reciprocation between first and second end limits of travel toward and away from the fixed path of travel of the workpiece;
at least one gate connectible in a repeatable located position with respect to the moveable pillars on each side of the fixed path for synchronized reciprocation between first and second positions toward and away from the fixed path of travel of the workpiece;
gate drive means engageable with a registered gate located in the repeatable located position on the at least two pillars for moving the registered gate along the fixed path of travel of the workpiece to remove the registered gate from the at least two pillars, and engageable with a replacement gate for moving the replacement gate into registry with the at least two pillars in the repeatable located position simultaneously as the previously registered gate is removed; and
locating means engageable between each pillar and the corresponding gate for locating the gate with respect to the moveable pillar in at least two dimensions, the locating means including at least two vertically spaced locators on each pillar for defining a vertical position and a horizontal position along an axis normal to the fixed path, and a moveable locator for locating the gate in a predetermined position along an axis parallel with respect to the fixed path of travel of the body when the moveable locator is in a first position and for allowing movement of the gate with respect to the pillars when the moveable locator is in a second position.

21. An apparatus for supporting a frame for movement relative to a workpiece to be processed at a workstation comprising:
at least one pillar at the workstation for reciprocal movement between a first position allowing entry and accurate positioning of at least one workpiece into the workstation, and a second position for accurately locating and clamping of the workpiece into the workstation;
at least one gate connectible in a repeatable located position with respect to the moveable pillar on each side of a fixed path of travel of the workpiece for synchronized reciprocation between first and second positions toward and away from the fixed path of travel of the workpiece;
gate drive means engageable with a registered gate located in a repeatable located position on the at least one pillar for moving the registered gate along the fixed path of travel of the workpiece to remove the registered gate from the at least one pillar, and engageable with a replacement gate for moving the replacement gate into registry with the at least one pillar in the repeatable located position simultaneously as the previously registered gate is removed; and
a pillar drive connected to the pillar at the workstation for driving the pillar harmonically between the first and second positions.

22. The apparatus of claim 21 further comprising:
at least one rail for guiding movement of the pillar between the first and second positions.

23. The apparatus of claim 21 wherein the pillar drive further comprises:
a reversible motor;
a crank arm connected to the motor for rotation through a predetermined rotational arc; and
a link connected between the crank arm and the pillar for translating rotational motion of the motor into harmonic motion of the pillar between the first and second positions.

24. The apparatus of claim 23 further comprising:
the pillar having a hollow interior; and the crank arm and link disposed within the hollow interior of the pillar.

25. The apparatus of claim 21 further comprising:
the frame mountable on the pillar for movement between the first and second positions, the frame supporting tooling for engagement with the workpiece at the workstation when the pillar is in the second position.

26. The apparatus of claim 25 further comprising:
the frame supporting at least one clamp for clamping the workpiece at the workstation when the pillar is in the second position; and
means located at the workstation for welding the workpiece when in a clamped position.

27. The apparatus of claim 26 wherein the welding means further comprises:
at least one robot for automated welding of the workpiece when in the clamped position.

28. The apparatus of claim 25 further comprising:
the frame releasibly mounted to the pillar.

29. The apparatus of claim 25 wherein the gate drive means further comprises:
a frame exchanger for removing a first frame from the pillar and for loading a second frame on the pillar.

30. The apparatus of claim 29 further comprising:
an automated drive for the frame exchanger for selectively positioning the first frame and the second frame on the pillar corresponding to the workpiece to be processed at the workstation.

31. The apparatus of claim 29 further comprising:
at least one frame locator connected to the pillar for engagement with the frame to be mounted by the frame exchanger.

32. In a vehicle body welding system including a workstation for welding components of a preassembled body with respect to one another, the body moveable along a fixed path of travel through the workstation, the improvement comprising:

at least one pillar at the workstation for reciprocal movement between a first position allowing entry and accurate positioning of components into the workstation, and a second position for accurately locating and clamping of the components;

at least one gate connectible in a repeatable located position with respect to the moveable pillar on each side of the fixed path for synchronized reciprocation between first and second positions toward and away from the fixed path of travel of the body;

locating means engageable at two spaced locations between each pillar and the corresponding gate for locating the gate with respect to the moveable pillar in at least two dimensions; and a pillar drive connected to the pillar at the workstation for driving the pillar harmonically between the first and second positions.

33. The improvement of claim 32 wherein the locating means further comprises:

at least two vertically spaced locators on each pillar for defining a vertical position and a horizontal position along an axis normal to the fixed path.

34. The improvement of claim 33 wherein the locating means further comprises:

the vertically spaced locators on one pillar offset with respect to the vertically spaced locators on the other pillar, such that the gate engages with the vertically spaced locators on each pillar only when immediately adjacent the repeatable located position.

35. The improvement of claim 33 wherein each of the vertically spaced locators further comprises:

a pocket defined by at least two locating rollers having vertical axes of rotation spaced horizontally from one another a sufficient distance for receiving at least one vertically extending locator surface releasably between the two rollers.

36. The improvement of claim 35 wherein each of the locating rollers has a leading alignment roller and a trailing alignment roller for aligning the vertically extending locator surface with the locator rollers prior to engagement between the locator rollers and the locator surface.

37. The improvement of claim 33 wherein at least one of the vertically spaced locators on each pillar further comprises:

at least one locating roller having a horizontal axis of rotation for releasably engaging a horizontally extending locator surface.

38. The improvement of claim 37 wherein the locating roller has a leading alignment roller and a trailing alignment roller for aligning the horizontally extending locator surface with the locator roller prior to engagement between the locator roller and the locator surface.

39. The improvement of claim 32 wherein the locating means further comprises:

a moveable locator for locating the gate in a predetermined position along an axis parallel with respect to the fixed path of travel of the workpiece when the moveable locator is in a first position and for allowing movement of the gate with respect to the pillars when the moveable locator is in a second position.

40. The improvement of claim 39 wherein the moveable locator further comprises:

a pocket defined by at least two locating rollers having vertical axes of rotation spaced horizontally from one another a sufficient distance for receiving at least one vertically extending locator surface releasably between the two rollers.

41. The improvement of claim 32 further comprising:

means for indexing a gate between a ready position corresponding to the repeatable located position on the pillars and a standby position spaced from the pillars.

42. The improvement of claim 32 further comprising:

gate drive means engage able with a registered gate located in the repeatable located position on the at least one pillar for moving the registered gate along the fixed path of travel of the body to remove the registered gate from the at least one pillar, and engage able with a replacement gate for moving the replacement gate into registry with the at least one pillar in the repeatable located position while the previously registered gate is removed.

* * * * *